Feb. 2, 1960   F. O. WALLENE   2,923,831
CONTROL APPARATUS
Filed June 4, 1958   4 Sheets-Sheet 4

INVENTOR.
FRANK O. WALLENE
BY
Hyde, Meyer, Baldwin & Doran
ATTORNEYS

2,923,831
CONTROL APPARATUS

Frank O. Wallene, Cleveland, Ohio

Application June 4, 1958, Serial No. 739,868

60 Claims. (Cl. 307—34)

This invention relates to improvements in a control apparatus and more particularly to a control apparatus for an electrical power system.

This invention relates to apparatus for measuring the draft of electric power on a source and being operable in response to ratio this draft bears to the previously established demand load reference level that has been incurred in an earlier demand time period, usually 15 minutes, of the demand time billing period, usually one month.

The need and usefulness of this apparatus will become clearly apparent as the interests of the power user is compared with that of the power distributor.

The power distributor usually charges for his services to large power users in two increments as demand charge and energy charge. Since he has no practical means for storing energy to be used during peak demand loads and since he must provide system capacity to meet demands when and as they occur, obviously, a portion of his generating capacity is seldom used and he therefore makes a "Ready-to-Serve" or demand charge as one item in order to defray his capital costs of operation. The actual energy used becomes a second charge. The instrumentation, such as a demand meter, required by the power distributor for measuring power under these circumstances shows end results; in contrast, the power user should have continuous information showing the load trends leading to these end results.

The power user should have information that shows the load trends in such terms as to be readily used as a guide for manually and also automatically controlling the use of power before such unwanted demand load peaks can establish themselves.

The disclosed apparatus provides load trend indications that can be readily interpreted from a distance by a quick glance. The conventional demand meter used by the power distributor is small and difficult to read from a distance. Furthermore, its indicator pointer returns to zero at the end of each demand time period, and then the operator must carefully watch the rate of rise of the load-pointer, and then compare this with the elapsed time in the demand time period. The apparatus herein described provides an instrument whose pointer never leaves the mid-scale or 100% position from month to month as long as the rate of power use draft remains at a constant level equal to the established kw. or kva. demand load reference level. The conventional demand meter returns to zero at the end of each demand time period even though the draft remains at a constant demand load reference level, which calls for continuous scanning of indications and interpretation thereof while considering elapsed time in the demand time period. Efficient load control then is therefore difficult if not humanly impossible to attain with the conventional demand meter.

In the system herein described, there is provided for load trend control not only visual indications that make supervision most effective but also an automatic control of energy transforming unit elements of the system whether they be electrical load or electrical generation sources.

Kwh. use is usually regarded as a measure of plant production output. It could well be therefore that the greatest overall gain would be to hold subsequent demands up as close as possible to the established demand load reference level. Attempts to hold demand at a lower point, it is assumed, would unduly interfere with plant output and thereby result in an economic loss.

The apparatus disclosed herein may be reset manually to a lower demand load reference level each month at the same time that the public utility reads and resets its demand meter at the end of the demand billing time period. Thus, the possibility of operating during the subsequent month at a lower demand load reference level is explored.

Generally there is no economic gain to be made by holding subsequent demand loads at a lower level than that already established as the demand load reference level. Therefore, the apparatus automatically recalibrates itself if the new setting was too low to permit required plant production.

An object of the present invention is to provide an apparatus with energy transforming unit control means of an operator-indicator-type and/or automatic-type; with said control means being responsive to a draft so that the unit is controllably responsive thereto; with the draft upon a source confined below a kw. or kva. demand load reference level over a given demand time period or below any other suitable reference level; with means for recalibrating said reference level manually and/or in response to any chosen external condition, such as the demand load draft on the source, time, etc.; with means for returning a load trend indicator to the reference level at the end of any chosen time period, such as a demand time period; and with manual control of energy transforming unit elements or manual selection of the programing of the automatic control thereof.

A further object of the present invention is to provide a control apparatus characterized by its compactness of design, many desirable operating advantages, ease of operation or use, control of an electric power system in an economic manner to provide maximum power utilization at minimum cost, and many desirable operating characteristics.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 4 is an electrical and mechanical diagram of unit P from Fig. 1, as it fits in the box P in Fig. 2, and of one of the control elements VA from Fig. 1; while

Figure 1:
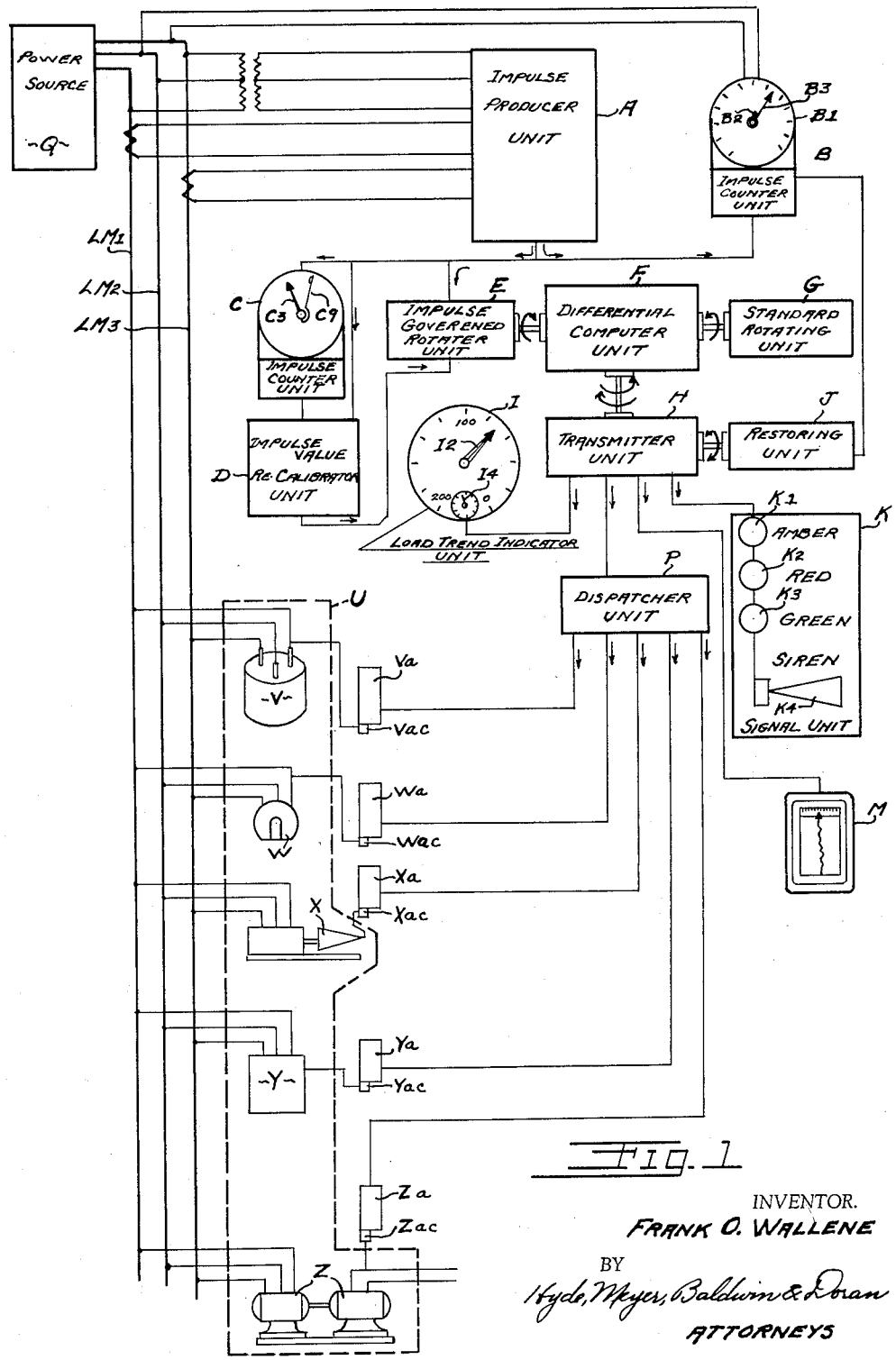
Fig. 1 is a schematic view of a typical electric power system layout with the component units of the present apparatus individually disclosed and with the operative connections therebetween shown schematically by lines.

Before the apparatus here illustrated is specifically described, it is to be understood that the invention here involved is not limited to the structural details or arrangement of parts here shown since mechanisms embodying the present invention may take various forms. It is also to be understood that the phraseology or terminology herein employed is for purposes of description and not of limitation since the scope of the present invention is denoted by the appended claims.

BRIEF DESCRIPTION OF MODE OF OPERATION IN A TYPICAL SYSTEM LAYOUT

The public utility, source Q, makes a demand charge for its power. This charge is the highest total power use measured in any demand time period, such as 15 minutes, during the demand billing time period, such as a calendar month. If this highest total power use is averaged over the 15 minutes of the demand time period, we obtain an average rate of power use which might occur over a full demand time period to incur this established demanding billing load during the prevailing demand billing period. This average load is known as the kw. or kwa. demand load reference level for the prevailing demand billing period. For optimum and steady plant production, the power user should maintain this draft on source Q as close to this average load as possible. However, if he does not come up to the average during some portion of the demand time period, he may use over the average during another portion of the same demand time period and still maintain the average load at the end of the demand time period. Hence, time and power are both important considerations.

The significant power ratio in this control apparatus may be expressed, by comparing the average rates of power use, as the ratio between the current average rate of power use from source Q (average draft on source Q) since the beginning of the current demand time period with the aforesaid demand load reference level (the average rate of power use over a full demand time period required to incur the established highest demand load incurred during the prevailing demand billing period). This significant power ratio may also be expressed, by comparing the total power use, as the ratio between the total actual draft on source Q since the beginning of the current demand time period and the aforesaid demand load reference level time integrated since the beginning of the current demand time period. This significant power ratio, as will be more apparent hereinafter, is shown by the shaft F15 of unit F.

Now, it should be readily apparent that if pointer I2 of unit I starts at 100% at the beginning of the demand time period, pointer I2 shows: (1) at the end of the demand time period, this significant power ratio as a true percentage on the large dial of unit I and this percentage is the percentage of the previously established demand load used during the last demand time period, and (2) during the demand time period, the demand time elapsed related trend of this percentage in response to the then existing significant power ratio.

Figure 5:
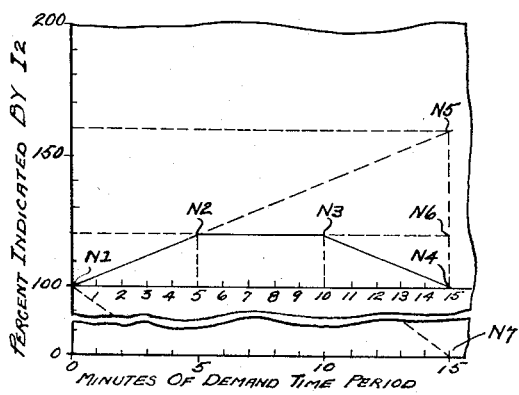
Fig. 5 is a graph of typical movements of the large pointer I2 of unit I.

Fig. 5 shows a typical graph of movement of pointer I2 movable over its scale dial, which extends counterclockwise from 0 to 200 percent. The curved lines of an actual graph have been straightened in Fig. 5 for simplicity of illustration. If the established demand load in Fig. 5 is assumed at 10 kwh. for a 15 minute demand time period, the demand load reference level is 40 kw. Assume that pointer I2 has moved from N1 to N2, N3 and N4. From N1 to N2, the draft on source Q has averaged 48 kw. for 5 minutes. If this 48 kw. draft had continued to N5 for 15 minutes, a new demand load of 16 kwh. would have been established. The operator can easily predict this level by observing at pointer I4, which shows the time elapsed in the demand time period, that ⅓ of the 15 minute demand time period has expired; and if the 20 percent overload is multiplied by three, a 60 percent overload of 16 kwh. demand will result (160% of 10 kwh.=16 kwh.). However, at N2, the draft on source Q was reduced to 40 kw. from N2 to N3. If this had been continued to N6, the new demand load would have been 12 kwh. corresponding to the 120 percent indication (120% of 10 kwh.=12 kwh.). However, at N3, the output of load element V, W, Y and/or Z was reduced and/or generating element X was increased so that the draft on source Q from N3 to N4 was reduced to 32 kw. by the unit control means from 10 to 15 minutes so that the pointer I2 returns to the 100 reference level.

If the draft on Q had been 40 kw. for the whole 15 minutes, pointer I2 would have traveled along the straight and horizontal 100 percent line from N1 to N4.

In Fig. 5, if there had been no power draft on source Q during the whole demand period, pointer I2 would have moved at a uniform rate from 100 percent at N1 to zero at N7 along the dotted diagonal line (the line would be straight if the graph had not been cut off) and would indicate only the elapse of time since no power was being used.

Fig. 1 discloses an apparatus for controlling the supply of electric power from A.-C. electric power source Q, such as a public utility, supplying power to a plant having an energy transforming unit U, comprising one or more energy transforming elements, such as electric arc furnace V, pulp grinder W, other plant loads Y lending themselves to regulation, synchronous A.-C. to D.-C. converter Z for supplying D.-C. power to the plant, and turbine driven generator X. Elements V, W, Y and Z are load elements transforming A.-C. power from source Q into mechanical, heat or D.-C. power; while element X is an A.-C. source transforming steam energy into A.-C. power to help source Q feed load elements V, W, Y and Z. The public utility demand load billing of the power from source Q is recorded by pointer B3 of impulse counter unit B counting the impulses produced by kwh. or kvah. meter unit A responsive to the draft on source Q.

Figure 4:
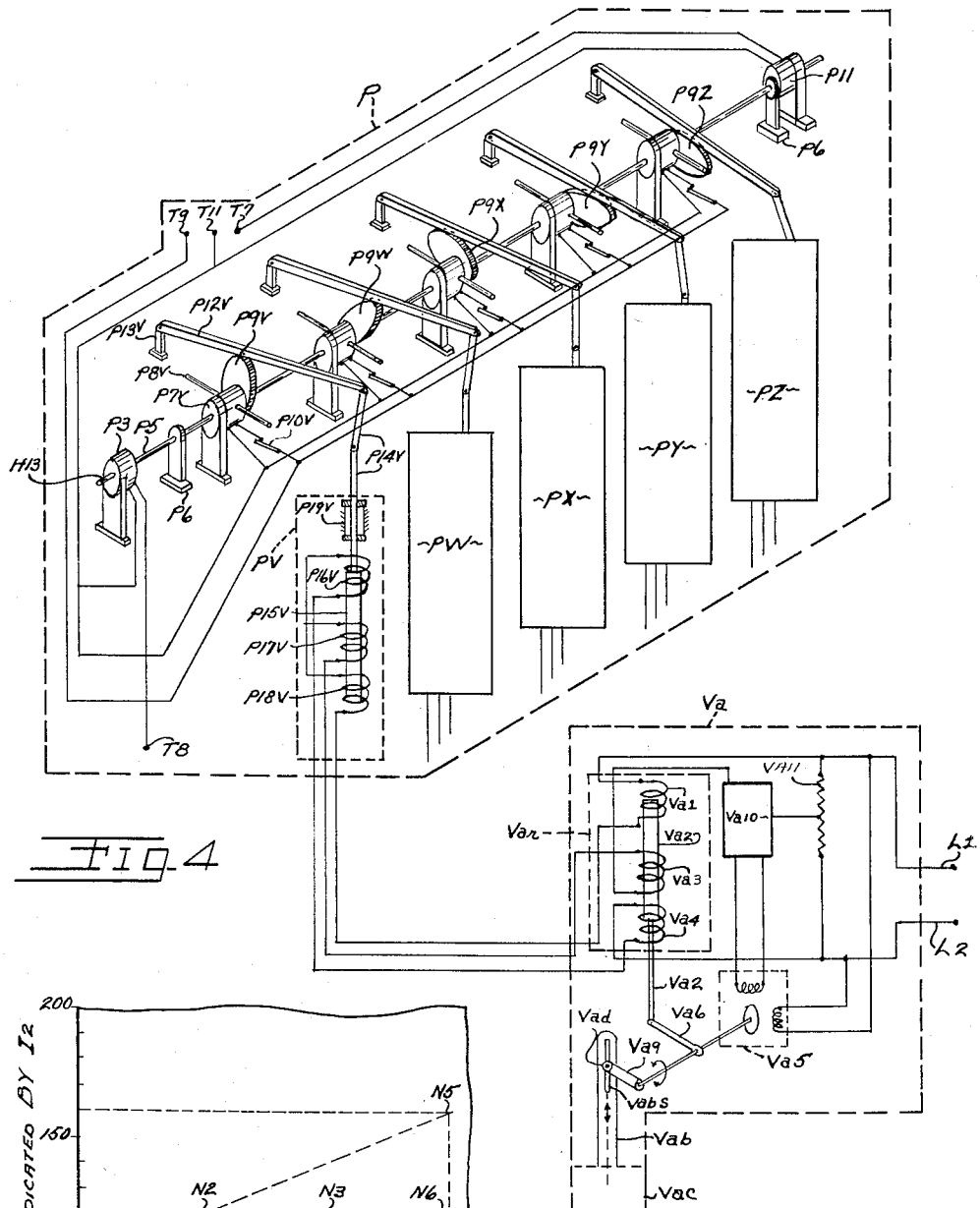

The elements V, W, X, Y and Z are controlled individually by similar conventional control elements Va, Wa, Xa, Ya and Za with each having, as shown for example in Fig. 4, a movable controller lever Vab on conventional control panel Vac of its control element Va. Lever Vab may be connected in Fig. 4 by nut and bolt unit Vad to the upper portion of control element Va for automatic control of element V in Fig. 1 by dispatcher unit P in Figs. 1 and 4; or lever Vab may, when nut and bolt unit Vad are detached, be manually controlled by the operator after sensing the pointer I2 on load trend indicator unit I; lights K1, K2 or K3 of signal unit K; siren K4 of unit K; or the record line on recording unit M. Unit P may be programmed in any desired manner for sequential, concurrent, oppositely moving, etc. changes in rate of energy transformation by elements V, W, X, Y and Z. Units I, K, M and P are each controlled by unit H.

Unit H is moved so as to make units I, K, M and P each responsive to the draft upon source Q measured by unit A so that the elements of unit U are controllably responsive for confining, if possible, the draft upon source Q below the kw. or kva. demand load reference level over each demand time period. Unit G rotates one input shaft of differential computer unit F at a constant speed corresponding to the demand load reference level (the average rate of power use over a full demand time period required to incur the established highest demand load) time integrated since the beginning of the current demand time period. Unit E rotates by impulses from unit A another input shaft to differential unit F at a speed corresponding to the total actual draft on source Q since the beginning of the current demand time period. If both input shafts rotate at the same speed, the ratio between these load totals fed into unit F will be one and pointer I2 will be stationary at 100 percent indicia mark and demand load during this demand time period will be the same as measured by pointer B2 in an earlier demand time period of the billing period. If the rate of power use is less now, pointer I2 will be below 100 percent; and if more, will be above 100 percent. If it is below 100 percent, the operator can manually increase by a control lever (such as lever Vab for element V) the load of element V, W, Y and/or Z and/or manually decrease power generated by element X. If it is over 100 percent, the load of element V, W, Y or Z may be decreased and/or the output of element X increased to decrease the draft on source Q in the hope that the reference level will not be exceeded at the end of the demand time period to establish a new demand load. Unit P performs the same functions automatically on these elements.

If pointer B3 is being moved clockwise and a higher demand load is being recorded, unit C will count the impulses from unit A and recalibrate at the end of the demand time period the length of each impulse from unit A driving unit E to make the newly established demand load the reference lever at "100" on unit I. Hence, since a new demand billing has been made on unit B, there is no justification for holding the draft on source Q below this new demand reference level. Units C and D recalibrate the apparatus to the new demand load reference level.

At the end of each demand time period restoring unit J returns through unit H pointer I2 back to "100" or the reference level for a fresh start in a new demand time period. Unit J also permits unit C to recalibrate unit D to a new demand reference level, if one has been established.

Other functions and uses of this apparatus will be described in more detail hereinafter.

BRIEF DESCRIPTION OF COMPONENT UNITS IN A TYPICAL SYSTEM LAYOUT

Fig. 1 shows an overall schematic assembly of the component parts of the system in a typical layout.

Power is supplied from an alternating current, three phase power source Q, such as a public utility, to 3 phase power lines LM1, LM2 and LM3. A transformer LT in Fig. 2 steps down one phase from these lines to a lower control A.-C. voltage for power lines L1 and L2. Direct current is supplied in Fig. 2 at terminals 16A and 16B where needed by A.-C. to D.-C. rectifier 16 receiving its A.-C. input power by a circuit from line L1 to rectifier terminal 16C, rectifier terminal 16D, and line L2.

Figure 2:
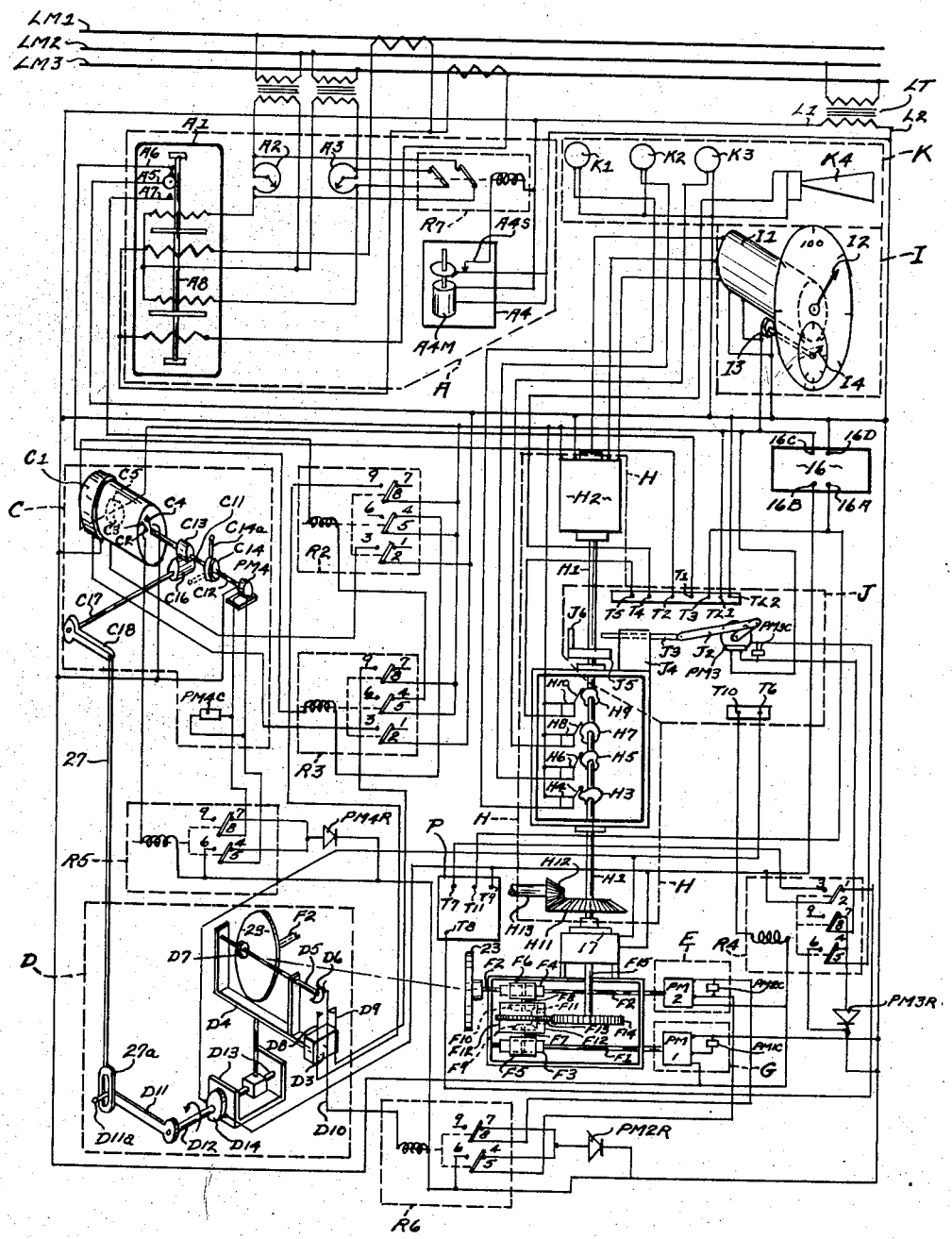
Fig. 2 is an electrical and mechanical diagram of apparatus component units A, C, D, E, F, G, H, I and K shown in detail with units P and J shown only in boxed diagram with appropriate terminals.
Figure 3:
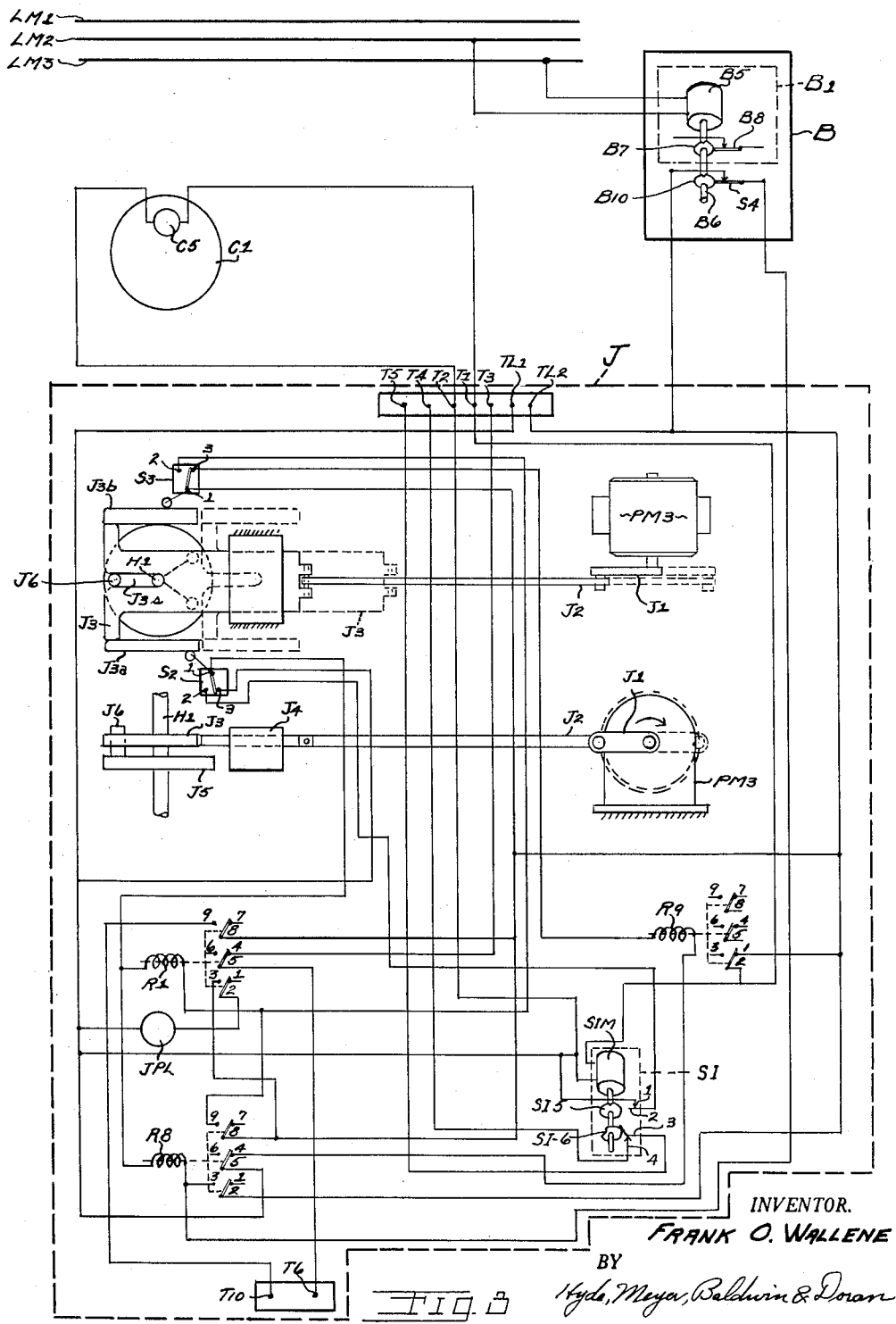
Fig. 3 is an electrical and mechanical diagram of unit J and the terminals thereof adapted to fit in the box in Fig. 2, of unit B from Fig. 1, and of a portion of unit C from Fig. 2.

Meters A1 and B1 in Figs. 1, 2 and 3 of units A and B are usually owned and maintained by the public utility and are conventional equipment. They act as a kwh. or kvah. demand meter with pointer B3 measuring the kwh. or kvah. draft upon source Q for each demand time period, such as 15 minutes, for determining demand billing over a billing demand time period, such as one month.

Impulse producer unit A includes conventional contact making kwh. or kvah. meter A1 provided with standard contact points A5, A6 and A7 driven by gearing from the meter shaft A8 with these contact points sending out electrical impulses corresponding to the revolutions of the meter shaft A8. Since one revolution of the meter shaft is a measurement by meter A1 of a definite block of power flowing in lines LM1, LM2 and LM3, then each impulse represents a certain size block or value of power draft on source Q. Although unit A is shown as having a contact making kwh. or kvah. meter A1, it will be readily apparent that meter A1 may be of any suitable type, such as a watt, voltage, amperage, volt-amp. non-impulse meter, etc. responsive to the draft on the power source Q and desirable advantages and modes of operation will be obtained.

In this system, impulses sent out by meter A1 of unit A are also picked up by the units B, C and E.

The impulses from meter A1 are transmitted to conventional demand type impulse-counter meters B1 and C1 of units B and C respectively in Figs. 1, 2 and 3. Since each impulse has a given value, meters B1 and C1, by counting the number of impulses, indicate the amount of power used in a given demand time period. The conventional register on meter A1 will do the same thing. Meters B1 and C1 however record the highest demand load in the demand billing period by recording the highest number of impulses obtained in any demand time period, such as 15, 30 or 60 minutes, as compared to the total power used during the full 30 day billing period of power use, as noted on the register of meter A1.

The pointers B3 and C3 on meters B1 and C1 are driven by dogs B2 and C2. These dogs are each driven by suitable mechanism by the impulses from meter A1 and are each returned to zero at the end of each demand time period by return motors energized by a switch momentarily closed, or returned by special gearing, at the end of each demand time period by a detent in a cam on a cam shaft driven by a small electrically driven synchronous timing motor, such as shown by switch B8, cam B7, cam shaft B6, and motor B5 or C5, located and built in as a part of the conventional meters B1 and C1. Thus the highest demand during the month is indicated by the position of the pointer B3 and C3. At the end of the month the pointers B3 and C3 are manually returned to zero by the meter reader and system operator respectively and thus made ready to register the highest demand load in the demand billing period during the next month.

Meters B1 and C1 each add structure to the standard meter described in the preceding paragraphs. Meter B1 adds in Fig. 3 a switch S4 only closed momentarily at the end of a demand time period by a detent in cam B10 also driven by shaft B6 and synchronous timing motor B5. Meter C1 adds a second pointer C9 coaxially mounted with but separate from pointer C3 and acting as a moving electrical contact arm coacting with pointer C3 that causes positioning motor PM4 and causes unit D to reposition themselves at the appropriate time to correspond with the position of pointer C3.

Since the demand time period plays a part in many aspects of the disclosed apparatus and this demand time period is determined by four different timing motors normally synchronously driven by the alternating frequency of power source Q, a brief explanation of this synchronous drive of the four timing motors B5, I3, C5 and S1M in Figs. 2 and 3 appears appropriate here. Timing motor B5 and I3 respectively in Figs. 3 and 2 are time driven respectively by current from lines LM2, LM3 and lines L1, L2. Timing motors S1M and C5 in Figs. 2 and 3 are each time driven by current from A.-C. lines L1 and L2 by a normally closed circuit from line L1 in Fig. 2 to terminal TL1 in Figs. 2 and 3; through parallel circuit through timing motor S1M of timing switch S1 and parallel circuit through terminal T2, timing motor C5, and terminal T1; relay R9 normally closed back contact 2 to 1; terminal T12 in Figs. 3 and 2; and line L2 in Fig. 2. Each of these timing motors B5, C5 and S1M make only one complete rotation in a demand period so as to actuate each switch contact by a detent in its driven cam, such as cam B7, S1–5 or S1–6, through only one cycle in one demand time period. These switch contacts are in Fig. 3 switch contact S4 and B8 of unit B and timing switch S1 contact 1 to 2 and contact 3 to 4.

Impulses from meter A1 also enter unit E causing its positioning motor PM2 to rotate the input shaft of unit F a certain number of shaft degrees per impulse depending on the control of these impulses exerted by unit D.

Referring to unit G this unit consists of a synchronous motor PM1 that runs continually without interruption at a constant speed as dictated by the electrical frequency of the power source Q.

Unit F is a differential having an input shaft F2 from unit E, an input shaft F1 from unit G, and one output shaft F15 connected to unit H which communicates the resultant position of the output shaft of unit F to units H, and through unit H to units I, M, K and P.

Unit D recalibrates the system by controlling the number of output shaft degrees movement of unit E per impulse received from unit A so that the shaft movement is in the ratio the prevailing demand load has to the highest demand already established. Units C and D automatically recalibrate the system to any new higher demand established during the billing period with this readjustment taking place at the end of the prevailing demand time period.

Unit I has a pointer I2 showing the load trends with respect to the highest demand load (demand load reference level) so far incurred in the prevailing billing period. Unit I also has a pointer I4 and a small dial showing the elapsed time of the prevailing demand time period. The operator is thus able to judge the urgency of making adjustment of unit U.

Unit J returns pointer I2 to 100% or the twelve o'clock position at the end of each demand time period at the same time that the meters B1 and C1 reset their dogs B2 and C2.

Signal unit K is added as a means of emphasizing the location of the load trend pointer I2 on unit I. The amber light K1 shows when the pointer I2 is in the 100% area on unit I, while the green light K3 shows in the range when the rate of power use is less than the high period already established. The red light K2 shows when the current rate of power use, if allowed to continue through the whole prevailing demand time period, will impose a new high demand load on unit B. The siren K4 blows when the red light K2 is on, and the time interval is about to run out, as shown by pointer I4. Thus an audible signal is added to the visual signal.

Unit M is a conventional curve drawing recorder that records the position of the load trend pointer I2 on unit I and is driven by a mechanism similar to the driving mechanism for pointer I2.

Dispatcher unit P provides automatic positioning information to control elements Va, Wa, Xa, Ya and Za in Fig. 1 automatically controlling the energy transforming units V, W, X, Y and Z illustrated.

*Unit G*

Positioning motor PM1 runs continuously and is energized by a circuit formed in Fig. 2 from line L1 to motor PM1, and line L2. Positioning motor PM1 is a conventional quarter phase wound motor with a condenser marked PM1C. Motor PM1 rotates input shaft F1 of unit F at a rated constant speed so that, when unit E remains at a standstill throughout the full demand time period, the pointer I2 will arrive at zero on the scale of unit I at the end of the demand time period.

ACTUATING IMPULSE TRANSMISSION TO UNITS C AND E

Motor PM2 and demand meter C1 of respective units E and C run intermittently depending on the impulses produced by meter A1 by its contacts A5, A6 and A7, as will be described hereinafter.

Impulses from meter A1 alternately energize relays R3 and R2 in Fig. 2 as contact A5, driven by shaft A8, engages alternately contact A6 or A7.

When meter A1 contact A5 to A6 closes and meter A1 contact A5 to A7 opens, relay R3 is closed by a circuit from line L1 to relay R2 closed back contact 5 to 4, relay R3 coil, meter A1 closed contact A6 to A5, and line L2.

When meter A1 contact A5 to A7 closes and meter A1 contact A5 to A6 opens, relay R2 is closed by a circuit from line L1 to relay R3 closed back contact 5 to 4, relay R2 coil, meter A1 closed contact A7 to A5, and line L2.

Relay R2 and R3 back contacts 4 to 5 provide electrical interlocking in the respective relay R3 and R2 energizing circuits so that only one relay can close at a time.

When closed, relay R2 or R3 provides an impulse to the mechanism for driving dog C2 in the conventional impulse counter demand meter C1 in unit C by its closed relay contact 2 to 3. The closing of either relay establishes a circuit from line L1 to meter C1, relay (either relay R2 or R3) closed contact 3 to 2, and line L2.

When closed, relay R3 starts, through relay R6, positioning motor PM2 in unit E by its closed relay R3 contact 8 to 9. Switch D3 contact D9 to D10 is closed in the position illustrated in Fig. 2. Then, relay R6 is closed by the closing of relay R3 setting up a circuit from line L1 to relay R3 closed back contact 8 to 9, switch D3 closed contact D9 to D10, relay R6 coil, and line L2.

Closing relay R6 starts motor PM2 rotating by setting up a motor energizing circuit from line L1 to motor PM2, relay R6 closed contact 5 to 6, and line L2. Positioning motor PM2 is a conventional quarter phase wound motor with a condenser marked PM2C.

Motor PM2, after once being started, continues to rotate until stopped after a predetermined movement of its output shaft F2 opening switch D3 contact D9 to D10. Assume for the purpose of the present discussion that disc wheel D7 remains at a given radius on wheel 23. The pertinent structure in unit D is that yoke D4 carries switch D3; and yoke D4 rotatably carries shaft D5, extending at right angles to shaft F2 driven by motor PM2, having fixed against rotation and axial movement thereon disc wheel D7 and cam D6 for actuating contact D10 of switch D3. Hence, rotation of motor PM2 rotates cam D6 to open switch D3 closed contact D9 to D10 to stop motor PM2 after 180° rotation of cam D6 releasing contact D10 so that its spring bias will move it to the left to close contact D8 to D10.

Dynamic braking is applied to motor PM2 upon opening of relay R6 by circuit from line L1 to motor PM2, through parallel circuits through relay R6 closed back contact 5 to 4 and through relay R6 closed back contact 8 to 7, A.-C. to D.-C. rectifier PM2R, and line L2.

Then, when relay R2 is closed, it will start motor PM2 through relay R6 in substantially the same manner. Relay R6 is closed by the closing of relay R2 setting up a circuit from line L1 to relay R2 closed back contact 8 to 9, switch D3 closed contact D8 to D10, relay R6 coil, and line L2.

Energizing relay R6 starts motor PM2 by the motor energizing circuit previously mentioned. Motor PM2 continues to rotate until cam D6 is rotated 180° back to the position illustrated in Fig. 2 to break switch D3 contact D8 to D10 to deenergize relay R6 and stop motor PM2 by dynamic braking, as previously mentioned, and to close switch D3 contact D9 to D10 to position the apparatus for actuation by closing of relay R3 again.

*Unit F*

Motors PM1 and PM2 drive input shafts F1 and F2 respectively of differential unit F with their unbalance or the difference between their rotational rates indicated by rotation of differential output shaft F15. Although any suitable differential may be used, the illustrated unit F has motors PM1 and PM2 respectively driving differential balance gear F11 by shafts F1 and F2 driven by motors PM1 and PM2, worm gears F3 and F4 keyed to shafts F1 and F2, worm wheels F5 and F6 driven by worm gears F3 and F4, shafts F7 and F8 keyed to worm wheels F5 and F6 and to bevel gears F9 and F10, and bevel gears F9 and F10 driving balancing gear F11 rotatably mounted in cage F12. Any movement of cage F12 drives output shaft F15 through peripheral gear F13 secured to cage 12 and driving gear F14 keyed to output shaft F15.

Unit H

Unit H receives its motion from units F and J and then unit H in turn controls units I, K, M and P. The motion from unit J will be discussed in detail later in the specification.

Unit F normally drives unit H. Output shaft F15 of unit F drives shaft H1 by normally engaged electromagnetic clutch 17 engaged and energized by a normally closed circuit from D.-C. rectifier terminal 16A in Fig 2 to terminal T3 in Figs. 2 and 3, relay R1 normally closed back contact 4 to 5 in Fig. 3, terminal T6 in Figs. 3 and 2, electro-magnetic clutch 17 engaged when energized, and rectifier 16 D.-C. terminal 16B.

Unit P is normally driven by unit H with shaft H1 of unit H normally driving shaft P5 of unit P in Fig. 4 by meshing bevel gears H11 and H12 in Fig. 2 keyed respectively to shafts H1 and H13, and by shaft H13 in Fig. 4 normally driving shaft P5, rotatably mounted in spaced stationary bearing pedestals P6, through electromagnetic clutch P3, engaged when energized. Clutch P3 is engaged and energized by a circuit from rectifier 16 D.-C. terminal 16A in Fig. 2 to terminal T11 in Figs. 2 and 4, electro-magnetic clutch P3 in Fig. 4, terminals T8 in Figs. 4 and 2, relay R4 normally closed back contact 1 to 2, and rectifier 16 D.-C. terminal 16B. Also, shaft P5 in Fig. 4 is free to rotate because electro-magnetic brake P11 is not normally energized and engaged to lock it against rotation to the frame of the apparatus by stationary bearing pedestal P6. The energizing circuit for brake P11 extends from rectifier 16 D.-C. terminal 16A to terminal T11 in Figs. 2 and 4, brake P11 in Fig. 4, terminal T7 in Figs. 4 and 2, relay R4 normally open contact 3 to 2, and rectifier 16 D.-C. terminal 16B.

Shaft H1 controls units I and K and shaft H1 is controlled by unit J at an appropriate time. Units I and M are controlled by selsyn transmitter H2 driven by shaft H1 and electrically coupled to selsyn receiver I1 of unit I and a comparable selsyn receiver in unit M (not shown). If a plurality of units I are placed in different locations for different operators, each may have its selsyn receiver I1 electrically coupled in parallel to selsyn transmitter H2 in the same manner. Unit K is controlled by appropriate cams H3, H5, H7 and H9 rotatably adjustably secured to shaft H1. As will be brought out in more detail hereinafter, unit J controls shaft H1 when electro-magnetic clutches P3 in Fig. 4 and 17 in Fig. 2 are disengaged; shaft H1 is moved by unit J in Figs. 2 and 3 by disc J5 keyed to shaft H1.

The directions of motions should be clear from the drawings. An increase in draft on source Q from the 100 percent position on unit I from the demand load reference level draft rotates shaft H1 counterclockwise (viewed from the bottom of Fig. 2 looking upwardly), rotates pointer I2 counterclockwise in Fig. 2, and rotates shaft P5 counterclockwise (viewed from the left in Fig. 4 looking upwardly toward the right).

UNIT CONTROL MEANS

The unit control means includes an operator-indicator-type unit control means, an automatic-type unit control means or both of these type unit control means depending on whether manual, automatic or both type controls of energy transforming unit U is wanted. However, with either or both types, suitable control of unit U is provided.

Either or both of these type unit control means include generically the aforementioned meter A1; units E, F and G; a major portion of unit D; and at least the drive of unit H for controlling the structure of: (1) the operator-indicator-type including units I, K and/or M, and (2) the automatic-type including unit P and the upper portion of control element Va, Wa, Xa, Ya and/or Za.

The energy transforming unit U may include one or more energy transforming unit elements V, W, X, Y or Z electrically connected to electric power source Q with some or all being electrically powered load unit elements, such as electric arc furnace unit element V, pulp grinder unit element W, other plant loads Y, synchronous power converter Z (converts A.-C. power from source Q to D.-C. power); and/or being power generating elements, such as turbine driven generator element X. Unit U and each element V, W, X, Y and Z thereof is automatically controllable by unit P or is manually controlled in response to operator observation of units I, K and/or M with units I, K, M and P controlled by the draft on source Q.

This generic structure is common to both types of unit control means. A suitable meter A1, responsive to the draft on source Q and being shown here as an impulse producing kwh. or kvah. meter A1, driving unit E by the impulses from meter A1 controlled by unit D as a first measuring means for moving unit E output shaft F2 proportionally to the draft on source Q. Unit G rotates its output shaft F1 at a uniform rate proportional to a constant draft at the demand load reference level time integrated from the beginning of the current demand time period. Unit F, a geared differential driven by shafts F1 and F2, is responsive to the unbalance between the rotation of these shafts F1 and F2, and the rate of change of this unbalance is indicated by the rate of movement of shaft H1. Shafts F7 and F8 rotate about the same axis respectively at a uniform rate proportional to the time integrated reference level and at a rate proportional to the draft on source Q. The amount of this unbalance is indicated by the position of shaft H1 controlling the position of indicator I2 of the operator-indicator-type unit control means and controlling the position of control shaft P5 of unit P of the automatic-type unit control means so unit U is controllably responsive to the draft on source Q, as will be more apparent hereinafter. Hence, the unbalance is indicated on the axis of shaft H1, indicator I2 or shaft P5. When the draft is at this reference level and shafts F1 and F2 are rotating at the same rate, shaft H1, indicator I2 and shaft P5 remain substantially stationary.

The apparatus is disclosed herein as used for controlling the demand load on source Q and confining, if possible, this draft below a kw. or kva. demand load reference level over a given demand time period. Then, shaft F2 measures the total draft on source Q from the beginning of the current demand time period while shaft F1 measures, to the same scale as shaft F2, the draft at a uniform rate at the kw. or kva. demand load reference level time integrated from the beginning of the same current demand time period. This reference level is the average rate of power draft over a full demand time period required to incur the established highest demand load. Hence, the shafts P5 and H1 show the heretofore mentioned "significant power ratio," which ratio is the relationship, from the beginning of the current demand time period, between the actual draft upon source Q and the draft if power were used at the average rate for the established demand load, designated here as the reference level. Pointer I2 shows: (1) at the end of the demand time period, this significant power ratio as a true percentage on the large dial of unit I and this percentage is the percentage of the previously established demand load used during the last demand time period, and (2) during the demand time period, the demand time elapsed related trend of this percentage in response to the then existing significant power ratio.

At the end of a demand time period, indicator I2 and shaft H1 must be returned to this reference level or 100 percent position so that the next demand time period will start with units E and G properly balanced. This operation is performed by unit J, as will be more apparent later in the description, and this unit J may be used harmoniously with either the operator-indicator-type of automatic-type unit control means.

Since the generic structure and feature of the unit control means has been described, the control by shaft H1 of units I, K and M of the operator-indicator-type and of unit P of the automatic-type will next be described.

OPERATOR-INDICATOR-TYPE ENERGY TRANSFORMING UNIT CONTROL MEANS

Movement of shaft H1 controls units I, K and M of the operator-indicator-type unit control means, which may consist of only pointer 12; light K1, K2 or K3; siren K4; or recorder unit M. Although only one of each of these units I, K and M are shown, a plurality of each or all may be provided with one at each control location in the plant, such as one unit I at each control element Va, Wa, Xa, Ya and Za, so that each operator may manually adjust his element V, W, X, Y or Z after visually or audibly sensing one of the indicators I, K and/or M and after manually disconnecting the coupling, such as nut and bolt unit Vad, between the automatic control arm Va9 and manual controller lever Vab.

Movement of shaft H1 correspondingly controls units I and M. Pointer 12 of unit I and the tracing pointer in unit M are each moved to correspond with the position of shaft H1 at all times by a selsyn receiver, such as selsyn I1 driving pointer 12, coupled with selsyn transmitter H2. Large pointer I2 is movable across its large dial relative to the 100 percent, or the demand load reference level, so that it is easily read at a large distance away. When it is to the right of "100," the average draft on source Q since the beginning of the current demand time period is below the demand load reference level. When it is to the left of "100," it is above this reference level.

The elapsed time of and the time still remaining in the current demand time period are also indicated for the operator's convenience in unit I by pointer 14 driven by synchronous motor 13 in the manner previously described and coacting with a dial as a time indicator.

Since pointers 12 and 14 are closely associated, the operator will obtain all needed control information by one glance at them.

Movement of shaft H1 correspondingly controls unit K. In addition to the visual indications of load-trends, as provided by pointer 12 on unit I, there is also unit K in Figs. 1 and 2 having lights and a siren to give emphasis to existing conditions.

Lights K1, K2 and K3 are respectively amber, red and green; and these lights are operated respectively by switches H4, H6 and H8 engaged by cams H3, H5 and H7 on shaft H1 in unit H. It is customary to have the amber light K1 energized and come on when pointer 12 is in the vicinity of "100" on the scale. When pointer 12 is to the left of "100," the red signal light K2 comes on because the percent scale behind pointer 12 increases in value in the counterclockwise direction. When pointer 12 is to the right of "100," the green signal light K3 comes on. Since each light K1, K2 and K3 is energized by a similar circuit, only the energizing circuit for light K1 will be described. This circuit is from line L1 to switch H4 closed by cam H3 at the appropriate time, light K1, and line L2. Cams H3, H5 and H7 are slightly out of phase relationship so as to independently energize lights K1, K2 and K3 at appropriate times.

If the red light K2 is to show that the load trend is on the way to establishing a new high demand load, and if elapsed time pointer 14 is approaching the end of the demand time period to indicate the urgency of making load adjustment, then siren K4 in unit K blows to add an audible signal to the visual signal to indicate that the draft on source Q is about to exceed the reference level and the end of the demand time period is approaching. Siren K4 is energized to blow by a circuit from line L1 to switch H10 closed by cam H9 at the same time as switch H6 is closed by cam H5 to light red light K2, terminal T5 in Figs. 2 and 3, timing switch S1 closed contact 3 to 4, terminal T4 in Figs. 3 and 2, siren K4, and line L2.

The operator-indicator-type unit control means may include any one of the following: pointer 12; light K1, K2 or K3; unit M; or siren K4 because each can be used by the operator for controlling unit U.

AUTOMATIC-TYPE ENERGY TRANSFORMING UNIT CONTROL MEANS

Each element V, W, X, Y, and Z of energy transforming unit U is automatically and individually controlled by a dispatcher unit P operable on a control element Va, Wa, Xa, Ya and Za for controlling the rate of energy transformation by unit elements V, W, X, Y and Z respectively of unit U. Unit P includes for controlling respectively elements V, W, X, Y and Z in Fig. 4 cams P9V, P9W, P9X, P9Y and P9Z simultaneously driven by shaft P5 and controlling differential transformer transmitters PV, PW, PX, PY and PZ controlling control elements Va, Wa, Xa, Ya and Za with differential transformer receivers, such as Var, in a differential transformer control system. It should be apparent that any conventional differential transformer or servo-motor system could be used. Since the control from shaft P5 to each element control panel, Vac, Wac, Xac, Yac and Zac is identical, only cam P9V, transmitter PV and control element Va will be described.

Element Va includes a differential transformer receiver Var and associated circuit for controlling vertically movable manual controller lever Vab of the control panel Vac for element V so that the position of lever Vab controls the rate of energy transformation by element V.

Shaft H1 in Fig. 2 drives shaft H13 and this shaft H13 in Fig. 4 drives shaft P5 by engaged clutch P3. Clutch P3 is engaged by an energizing circuit from rectifier 16 D.-C. terminal 16A to terminal T11 in Figs. 2 and 4, clutch P3, terminal T8 in Figs. 4 and 2, relay R4 closed back contact 1 to 2, and rectifier 16 D.-C. terminal 16B.

Cam P9V is driven by and moves with shaft P5 through energized electro-magnetic clutch P7V detachably securing the cam to shaft P5. Clutch P7V is energized by a circuit from rectifier 16 D.-C. terminal 16A to terminal T11 in Figs. 2 and 4, clutch P7V in Fig. 4, normally closed switch P10V, terminal T9 in Figs. 4 and 2, and rectifier 16 D.-C. terminal 16B.

Cam P9V in its rotational movements raises or lowers lever P12V mounted on stationary fulcrum pivot P13V and in so doing raises or lowers links P14V pivotally secured at the upper end to the distal end of lever P12V and at the lower end to the magnetic core P15V of differential transformer transmitter PV.

Differential transformers PV and Var and their circuit are of any conventional type and one in common use is illustrated. This is the differential transformer, null balance A.-C. bridge type. These transformers respectively comprise three coils P16V, P17V, P18V and Va1, Va3 and Va4 with primary coils P16V, P18V and Va1, Va4 with single secondary coils P17V and Va3 mounted between them and comprise cores P15V and Va2. The two primary coils of each transformer are connected so that their magnetic fluxes are opposed and a zero voltage is induced in the secondary coils when the cores are centered. All primary coils are connected in series between lines L1 and L2 so that the same current flows through each. Power lines L1 and L2 supply power to these differential transformers in the usual manner. When the core P15V is off center, it alters the coupling between the primary and secondary coils and this results in the induction of a voltage into the secondary coil P17V. The magnitude of the voltage is a function of the amount of displacement of the core P15V from the geometric center of the coils. Phase of the voltage is determined by the direction of movement by cam P9V of the core P15V from the center of the coils.

Radial movement of the periphery of cam P9V moves vertically transmitted differential transformer core P15V. When the core P15V is moved with respect to its three fixed coils P16V, P17V, and P18V of the differential transformer PV, an output voltage, which corresponds to the movement of core P15V, is produced in the center or secondary coil P17V. This voltage is transmitted on the three wires connecting the transmitter PV to the receiver differential transformer Var. As a result, this output voltage, as produced by the transmitting differential transformer PV, generates a corresponding voltage in the primary windings Va1 and Va4 of the receiver differential transformer Var, as fully understood in the art. This, in turn, produces a corresponding output voltage in the secondary winding Va3 of said receiver transformer Var, which latter voltage is then applied to an electronic amplifier Va10 wherein it is amplified and acts upon motor Va5, which moves vertically the core Va2 of the receiver transformer Var until the output voltage becomes zero. Potentiometer Va11 is used to provide the desired operating voltage for amplifier Va10. Motor Va5 not only rotates arm Va6, pivoted at ist distal end to the lower end of core Va2, to move core Va2 to the same vertical position as core P15V but also rotates arm Va9, keyed to shaft Va8 and pivotally secured by nut and bolt unit Vad to manual control lever Vab of control panel Vac for controlling the rate of energy transformation in element V. Similar control is provided for elements W, X, Y and Z.

The rate of energy transformation by each unit element V, W, X, Y and Z is positively and independently controlled in a predetermined manner in response to the draft on source Q throughout the draft range on source Q whether the draft be above or below the demand load reference level. Here, cam shaft P5, driven by shaft H1, has cams P9V, P9W, P9X, P9Y and P9Z individually controlling respective elements V, W, X, Y and Z. As shaft P5 is rotated, the rate of energy transformation of each element V, W, X, Y and Z will be controlled in a predetermined manner (increased, decreased or kept constant) depending on the shape of and phase relation between the cams P9V, P9W, P9X, P9Y and P9Z, some of which may be of the same shape or all of different shape.

However, this predetermined manner may be manually changed in several ways so that a given arcuate movement of shaft P7 will have a different effect on the rate of energy transformation of one or more elements. Since the same type adjustment may be independently made for each control element Va, Wa, Xa, Ya and Za and for each cam P9V, P9W, P9X, P9Y and P9Z because each has similar structure, only element Va and cam P9V will be discussed.

First, the rate of energy transformation by element V may be increased or decreased for a given setting of cam P9V by loosening, relocating along slot Vabs, and retightening nut and bolt unit Vad as a connecting means so that manual controller lever Vab will be moved to a new setting for this cam setting. Hence, the length of slot Vabs provides many different operating rates for element V for each setting of cam P9V. The bolt of unit Vad is one of conventional type having a head, threaded portion extending through slot Vad, and a cylindrical portion located as a step diameter between the head and threaded portion to rotatably receive lever Va9. The nut of unit Vad pulls lever Vab against the thread side shoulder of the cylindrical portion. Hence, tightened unit Vad permits arm Va9 to pivot relative to lever Vab while locking the pivot along slot Vabs.

Second, one element V may be manually controlled by lever Vab while the other elements W, X, Y and Z are automatically controlled by shaft P5. If unit Vad is disconnected, element V may be manually controlled independently of unit P, turned off, or set at any desired energy transformation rate which will not change as shaft P5 rotates.

Third, cams P9V, P9W, P9X, P9Y and P9Z may be individually rotationally adjusted on shaft P5 to provide any desired rate and type control of the energy transformation rate by elements V, W, X, Y and Z, such as sequential, concurrent, preferential control adjustment, or simultaneous control adjustment of the elements. Each cam, such as cam P9V, is adjustably mounted on shaft P5 and is adapted to be rotated to a new rotational phase relationship with respect to the other cams. For example, cam P9V may be adjusted by opening switch P10V to deenergize clutch P7V by breaking its energizing circuit, by manually moving handle P8V on cam P9V to reset cam P9V to a new position, and closing switch P10V to lock cam P9V to shaft P5 at the new setting. These cams may be set in any desired preferential, sequential, concurrent, etc. control of elements V, W, X, Y and Z.

Fourth, one element may decrease its energy transformation rate, such as load element V, W, Y or Z, while the other element, such as element X, increases its rate by operating respectively on the rising and lowering sides of cams P9V, etc. This feature is especially desirable when the draft on source Q is about to or has exceeded the established demand load reference level. Then, it is desirable to decrease the power draft rates of some or all of the load elements V, W, Y and Z and to increase the electrical power generation of turbine-generator element X as a power source supplementing source Q so as to reduce the demand load peak. Element X will continue to produce power until the peak demand, measured by unit B has been reduced to 100% or the reference level on unit I. Since units V, W and Z are process type loads transforming energy from A.-C. power into mechanical power or D.-C. power with their production output rates being adjustable, decrease in load will be merely a reduction in production output.

RECALIBRATION—GENERAL

The apparatus may be recalibrated in any suitable manner in response to any suitable external condition. This recalibration takes the specific form in this disclosure of variation in the number of shaft degrees of movement of shaft F2 by variation of the frequency or duration of energizing impulses from meter A1 to motor PM2 per a given block of power in lines LM1, LM2 and LM3 detected by meter A1.

This recalibration may take any one of or any suitable combination of the following forms (the component parts mentioned briefly here will be described with their functions in more detail hereinafter): (1) Periodic recalibration by time clock A4 in response to time for taking advantage of higher demand load permitted in "off-peak hours" by public utility source Q; (2) Recalibration by units C and D in response to newly established demand loads to raise the demand load reference level; and (3) Manual recalibration or automatic recalibration in response to any other external condition.

RECALIBRATION IN RESPONSE TO TIME

Periodic recalibration occurs in response to time to take advantage of higher demand load permitted in "off-peak hours." Here, a portion of unit A in the potential circuit of meter A1 reduces the number of impulses by meter A1 per given amount of power during the so-called "off-peak hours" when by contract provision the customer may impose greater demands on the utility system without charge. Calibration rheostats A2 and A3 are not normally in the potential circuit of meter A1 and are shorted out. However, during "off-peak hours," these rheostats are inserted so that fewer energizing impulses are provided to drive motor PM2 a shorter distance per given power block.

Short out of rheostats A2 and A3 is suitably controlled.

Time clock switch A4 is a conventional type instrument often used in controlling electric signs. It has a synchronous timing motor A4M driven and energized by a circuit from line L1 to motor A4M and line L2. Motor A4M rotates its cam once every 24 hours so that switch A4S is open or closed during selected portions of the 24 hour period. When "off-peak hours" occur, switch A4S is held closed by the motor driven cam to insert rheostats A2 and A3 in the potential circuit. As switch A4S closes, relay R7 coil is energized by a circuit from line L1 to relay R7 coil, closed switch A4S and line L2. With the energization of relay R7 coil, the contacts for said relay are opened to connect the rheostats A2 and A3 in the potential circuit of meter A1, as is seen in Fig. 2. Closing of relay R7 contacts by deenergizing relay R7 provides parallel short circuits around rheostats A2 and A3 in the potential circuit of meter A1 when switch A4S is open.

Hence, this structure acts as a time operated means for adjusting the response of meter A1 of the unit control means to the draft upon source Q with respect to time to increase the permissive draft and the reference level during "off-peak hours" by changing the calibration of movement of shaft F2. However, it should be readily apparent that change of calibration of movement of shaft F1 would obtain similar results.

RECALIBRATION BY NEWLY ESTABLISHED DEMAND—JOINT ACTION OF UNITS C AND D

As mentioned earlier, when the established demand load reference level (100 percent on unit I) is being exceeded during the demand time period, either unit P may automatically decrease draft on source Q by lowering the energy transformation rate of load elements V, W, Y and Z and/or by increasing electric power output of element X; or the operator, after observing pointer I2, may manually adjust element V, W, X, Y and/or Z to reduce the demand. However, if these efforts fail and if the established or first demand load reference level is exceeded by a second or new demand load, which adjustment of unit U has not been able to reduce, there is no economic gain in holding subsequent demand loads to or below the established first demand load reference level. The structure described here automatically recalibrates the unit control means by radial movement of disc wheel D7 on disc 23 to the second or new demand load reference level for use as the established demand load reference level in subsequent demand time periods. Although the change in reference level by unit C is indicated by a new position for link 27, this recalibration of disc wheel D7 takes place at the end of the current or prevailing demand time period, even though this recalibration may occur at a time spaced subsequent to the movement of link 27, by the joint action of brake D14 and unit J, as will be described in more detail later.

Recalibration of the apparatus is performed by units C and D in response to the draft on source Q and to a newly established demand load to raise the demand load reference level. To accomplish this, the value of impulses from meter A1 to unit E must be recalibrated any time that a demand is incurred that is higher than the previous high demand load established so that the the output of meter A1 varies in relation to the reference level. This recalibration is accomplished by cooperative action between units C and D shown in Figs. 1 and 2. The position of crank C18 of unit C is determined by the newly established demand reference level and its position is effective by link 27 to determine the position of arm D11 controlling the recalibration of the apparatus by the position of disc wheel D7 controlling the impulse duration to motor PM2.

The recalibration by the position of arm D11 should be readily apparent. As mentioned before in describing impulse transmission to unit E, the radial location of disc wheel D7 on disc 23 controls by switch D3 the length of each energizing impulse from relay R2 or R3 to motor PM2. If disc wheel D7 is making contact near zero radius point of disc 23, then a large amount of movement of shaft F2 would be required to move shaft D5 through the 180° movement required for cam D6 to interrupt three way switch D3 so that motor PM2 would remain energized for the full length of the impulse from meter A1 through relay R2 or R3. At the other extreme, when disc wheel D7 is making contact on disc 23 at the outer edge or maximum radius, then only a few shaft degrees of rotation of shaft F2 will operate three way switch D3, reduce the impulse length from meter A1, and thereby open relay R6 to stop motor PM2 after a much shorter motor travel. In unit D, disc wheel D7 is radially repositioned by permitting arm D11, weighted to normally swing counterclockwise in the direction of the arrow in Fig. 2, to swing counterclockwise and thus swinging yoke D4 (carrying switch D3, cam D6, shaft D5 and disc wheel D7) about the longitudinal axis of shaft D12, rotatably supported in spaced stationary bearing and keyed to arm D11 and yoke D4. However, arm D11 is held against movement by electro-magnetic brake D14 energized by a circuit from rectifier 16 D.-C. terminal 16A to terminal T3 in Figs. 2 and 3, relay R1 closed back contact 4 to 5, terminal T6 in Figs. 3 and 2, brake D14, and rectifier 16 D.-C. terminal 16B. When the brake D14 is deenergized in the manner brought out in more detail hereinafter recalibration takes place by changing the radial location of disc wheel D7 on disc 23.

Although arm D11 may be moved manually or by any other suitable condition responsive unit, crank C18 provides the control for arm D11 through link 27 in response to the newly established demand load. Also, disc wheel D7 will retain its radial position and reference level independently of any variation in voltage output of source Q. In contrast, variation in voltage output will change the effect by rheostats A2 and A3 on the impulse output of meter A1.

The position of crank C18 of unit C is determined by the newly established demand load and the mechanism for controlling its position will next be described.

Meter C1, as was mentioned earlier, is a conventional impulse counter demand meter to which has been added a second pointer C4 as a complement to pointer C2 with which the meter C1 was initially provided. Pointer C4 is mounted on shaft C11, which shaft is coaxial with but not connected to the driving shaft of pointer C2. Shaft C11 also has mounted thereon worm gear C13 and friction drive plate C14. Plate C14 frictionally bears against shaft C12 for drivingly connecting shaft C11 and shaft C12, which shaft C12 is mounted coaxially with shaft C11.

Meter C1 controls the position of pointer X. Pointer C3 as stated before is raised by dog C2 actuated by impulses received from relays R2 and R3 closed contacts 2 to 3. At the end of the demand time period, the dog is returned in the conventional manner to zero by the demand time period established by timing motor C5, leaving pointer C3 at the high position. For example, subsequent power use that is lower will not move the pointer C3 to a higher point on the scale. Then, as will be apparent hereinafter, pointer C4 will also remain stationary.

Assume that a higher demand for power occurs than has already been established. Then, the position of pointer C3 determines the positions of pointer C4 and arm C18. Meter C1 obtains more impulses per demand time period and pointer C3 contacts pointer C4. Then, relay R5 is energized by a relay energizing circuit from line L1 to pointer C4, pointer C3, relay R5 coil, and line L2. This circuit closes relay R5 causing positioning motor PM4 to move clockwise by a motor energizing circuit from line L1 to motor PM4, relay R5 closed contact 5 or 6, and line L2. Positioning motor PM4 is a conventional quarter phase wound motor with a condenser marked PM4C. Motor PM4 then rotates pointer C4 clockwise through a drive from motor PM4 to shaft C12, friction plate C14, shaft C11 and pointer C4. Motor PM4 also repositions crank C18 by a drive from shaft C11 to worm gear C13, worm wheel C16, rotatable shaft C17 keyed to gear C16, and arm C18 keyed to shaft C17. As pointer C4 is rotated by motor PM4 ahead of pointer C3, the contact between pointers C3 and C4 is opened to de-energize relay R5 coil, break the aforementioned energizing circuit for motor PM4, and thus stop motor PM4. Hence, pointer C4 and crank C18 are advanced and repositioned by the notching movement of motor PM4.

Motor PM4 is accurately stopped by dynamic braking applied to motor PM4 upon opening of relay R5 by a circuit from line L1 to motor PM4, through parallel paths from motor PM4 through relay R6 closed back contact 5 to 4 and relay R6 closed back contact 8 to 7, A.-C. to D.-C. rectifier PM4R, and line L2.

Hence, when brake D14 is de-energized at the end of the demand time period, arm D11 is free to swing counterclockwise to the bottom of rod slot 27a and disc wheel D7 is positioned to contact disc 23 at a greater face radius that is proportional to the position of pointer C3 on meter C1 and hence proportional to the newly established demand. Thus when pointer C3 is at half scale, disc wheel D7 is midpoint between zero and maximum radius on disc 23, and when pointer C3 is at full scale, disc wheel D7 is at maximum radius. Thus, it will be apparent that the position of pointer C3 governs the number of shaft degrees turned by shaft F2 per impulse from meter A1 received by motor PM2, and the greater the radial position of disc wheel D7, the shorter the travel of shaft F2 per impulse to motor PM2. For example, if disc wheel D7 is making contact near zero radius point of disc 23 at a low established demand, then a large amount of movement of shaft F2 would be required to move shaft D5 through the 180° movement required for cam D6 to interrupt three way switch D3 to stop motor PM2. At the other extreme, when disc wheel D7 is making contact on disc 23 at the outer edge or maximum radius at maximum established demand load, then only a few shaft degrees of rotation of shaft F2 will operate three way switch D3, reduce the impulse length from meter A1, and thereby open relay R6 to stop motor PM2 after a much shorter motor travel because motor PM2 will receive a much shorter impulse from meter A1.

Recalibration of unit D does not occur until the end of the demand time period. If it occurred before the end, the impulse duration to motor PM2 would be changed and units I, K and P would not give accurate indications and control of unit U. Hence, as will be described in more detail hereinafter, brake D14 is not de-energized until the end of the prevailing demand time period. However, during the demand time period, rod 49 is permitted to lower to its new position without rotating arm D11 because elongated slot 27a of rod 27 can slide downwardly over pin D11a on arm D11 held by brake D14. When the brake D14 is later deenergized, arm D11, by its weighted construction, rotates counterclockwise until pin D11a comes to rest in the bottom of rod slot 27a.

One of the features of this structure is that units C and D continually hunt the reference level for optimum power use. If the established demand load reference level for disc wheel D7 is too low, they recalibrate the unit control means to a new reference level, used in subsequent time demand periods of the billing period, established by the power draft in any demand time period, such as 15 minutes, of the billing demand time period, such as one month.

Although units C and D change the output of unit E, similar recalibration to a higher demand level may be effected by changing the rotational speed of shaft F1 by suitably controlling unit G.

At the end of the monthly demand billing time period when the utility company resets its pointer B3 in Fig. 1 on demand meter unit B, the power user resets crank C18 in Fig. 2, arm D11, and pointers C3 and C4 of unit C by manually rotating friction drive plate C14 counterclockwise (in a direction opposite to the demand recalibration action by pointer C3 moving clockwise by higher demand) by handle C14a on plate C14 driving shaft C11 and pointer C4. However, the presence of drive plate C14 permits resetting pointer C4 without rotating shaft C12 directly connected to motor PM4. Also, disc wheel D7 may be moved radially inwardly on disc 23 in spite of brake D14 by either momentarily breaking the energizing circuit to brake D14 or adjusting brake D14 so that manual return movement of handle C14a permits slippage but the weight of yoke D4 and arm D11 will not permit pin D11a to fall in slot 27a. In so doing, a lower demand load reference level is provided for the ensuing demand billing time period. If this new setting proves insufficient to meet required plant production needs, unit C will again automatically recalibrate the apparatus to the highest demand load incurred.

UNIT J AND ACTUATIONS OCCURRING AT THE END OF DEMAND TIME PERIOD TO TIMING MOTORS I3, B5, C5 AND S1M, TO BRAKES D14 AND P11, TO CLUTCHES 17 AND P3, TO BRAKE P11 AND TO UNITS D, H, I, K, M AND P

At the end of the demand time period, each of the following events occurs:

(1) Synchronously driven timing motors I3, B5, C5 and S1M complete one rotation to indicate the end of a demand time period;
(2) These motors B5 and C5 cause the return of pointer driving dogs B2 and C2 in a counter-clockwise direction to zero position;
(3) Pointer I4, driven by timing motor I3, starts to measure a new time demand period;
(4) Shaft H1 is returned by unit J to the demand load reference level. This action returns pointer I2 to the demand load reference level, "100" or mid-scale position by coupled selsyns H2 and I1;
(5) While return motion of shaft H1 occurs, unit J also:
 (a) lights pilot light JPL in Fig. 3 to indicate that return motion is taking place;
 (b) disengages clutch 17 in Fig. 2 so shaft H1 can be returned without causing movement of unit E, F or G, and conversely, movement of units E, F or G will not move shaft H1;
 (c) disengages clutch P3 and engages brake P11 in Fig. 4 so control shaft P5 will be locked and will not be moved by return of shaft H1 and the rate of energy transformation by unit U will not be changed, and
 (d) disengages brake D14 in Fig. 2 so unit C and rod 27 can recalibrate unit D to a new demand load reference level, if necessary.

Of these events, all have been referred to heretofore except events (4), (5a) and (5c).

Since public utility's meter B and unit J must synchronously operate over the same demand time period, suitable means reestablishing the normally maintained synchronization of timing motors B5, C5 and S1M is preferably provided. A suitable signal, for indicating the end of a demand time period or any predetermined phase thereof, can be used for keeping or reestablishing synchronization. This may be the signal from pilot light JPL or the signal from switch S4 of demand meter B1 closed by timing motor B5 of unit B driving return movement of dog B2. Manual resynchronization may be performed by waiting until light JPL is lit and then deenergizing the apparatus by braking line L1 or L2 at transformer LT until dog B2 returns counterclockwise. Then when the apparatus is reenergized, synchronization will be reestablished. Automatic resynchronization in response to closing switch S4 will be described hereinafter as the so called first mode of operation.

Shaft H1 is returned back to the demand load reference level by unit J. Here is a brief description of its general mode of operation. When timing motor S1M in Fig. 3 indicates the end of a demand time period has occurred, positioning motor PM3 rotates its crank J1 clockwise from a position of rest, which is with its crank J1 in the dotted line or extreme right hand position in Fig. 3. During this rotation, crank J1 moves connecting rod J2 to the left with rod J2 pushing crosshead J3 in crosshead head guide J4 to the extreme left or solid line position and finally pulls it back to the extreme right hand or dotted line starting position as positioning motor PM3 makes one full revolution and then comes to rest. During this crosshead movement, pin J6 on shaft disc J5 fastened to shaft H1 has been rotated at the beginning of the demand time period to the reference level position causing pointer I2 to assume a mid-scale position corresponding to 100 percent on the dial of unit I in Fig. 1 or what could be termed as the center of the scale or mid-scale position on the dial. For example, pin J6 may be in one of the two extreme dotted line positions of Fig. 3 and the movement of crosshead J3 to the left will return it to the solid line position by entrapping pin J6 in the crosshead slot J3s. When motor PM3 has withdrawn crosshead J3 to the extreme right, shaft H1 is free to be rotated in a range of approximately 300° shaft degrees, the range of movement of pointer I2, between the dotted line position of pin J6 in Fig. 3.

Crosshead J3 carries switch trip shoes J3a and J3b adapted to coact respectively with switches S2 and S3. When crosshead J3 is in the dotted line position, switch S2 contact 1 to 2 and switch S3 contact 1 to 2 are closed, while switch S2 contact 1 to 3 and switch S3 contact 1 to 3 are open. As crosshead J3 travels to the left toward the solid line position, switches S2 and S3 are sequentially actuated respectively by engagement by shoes J3a and J3b. Switch S2 contact 1 to 3 first closes while contact 1 to 2 opens and later switch S3 contact 1 to 3 closes while contact 1 to 2 opens.

Since many circuits are described and many circuits are made and broken several times, each circuit in this section will be numbered. Since some of the circuits have been described before and are essential when return motion does not occur, the condition of the components will be described in detail before the beginning, during and after the end of the return action by unit J.

Also, unit J in Fig. 3 always has its terminal TL1 connected in Fig. 2 to line L1 and its terminal TL2 connected in Fig. 2 to line L2 so that the circuits in Fig. 3, whenever possible, will be traced from terminals TL1 and TL2 in Fig. 3 instead of from lines L1 and L2 in Fig. 2.

Before the beginning of the return motion, unit J is in this condition. Switches S2 and S3 are normally closed with switch S2 contact 1 to 2 closed and with switch S3 contact 1 to 2 closed. Positioning motor PM3 is stopped. Relays R1, R4, R8 and R9 are open. As mentioned before, open relay R1 energizes electric brake D14 (engaged) and clutch 17 (engaged) by a first circuit from rectifier 16 D.-C. terminal 16A to terminal T3 in Figs. 2 and 3, relay R1 closed back contact 4 to 5, terminal T6 in Figs. 3 and 2, parallel paths through clutch 17 and brake D14, and rectifier 16 D.-C. terminal 16B. Also, open relay R4 in Fig. 2 deenergizes in Fig. 4 brake P11 (disengaged) by breaking at relay R4 open contact 2 to 3 a second circuit from rectifier 16 D.-C. terminal 16A to terminal T11 in Figs. 2 and 4, brake P11, terminal T7 in Figs. 4 and 2, relay R4 contact 3 to 2, and rectifier 16 D.-C. terminal 16B. Hence, during the demand time period, energized brake D14 prevents drop of arm D11 in unit D for demand reference level recalibration during the demand time period, clutch 17 is engaged so that unit F can drive shaft H1, clutch P3 is engaged and brake P11 is disengaged so shaft H13 can drive shaft P5. Open relay R4 in Fig. 2 energizes clutch P3 (engaged) by a third circuit from rectifier 16 D.-C. terminal 16A to terminal T11 in Figs. 2 and 4, clutch P3, terminal T8 in Figs. 4 and 2, relay R4 closed back contact 1 to 2, and rectifier 16 D.-C. terminal 16B.

At the same time that the meter B1 in the utility company's unit B begins a new demand time period, motors C5 and S1M in Figs. 2 and 3 perform their functions to start a new demand time period measurement by the apparatus. Synchronous motor C5 normally returns counterclockwise in Fig. 2, the dog C2, used for driving pointer C3, to its starting position simultaneously as synchronous motor S1M on time switch S1 closes switch S1 contact 1 to 2 by a detent in its cam for a short interval of time at the end of the demand time period.

Closing switch S1 contact 1 to 2 closes relay R1 by a fourth circuit. Relay R1 is closed by this fourth circuit from terminal TL1 to switch S1 closed contact 1 to 2, limit switch S2 normally closed contact 2 to 1, relay R1 coil, limit switch S3 normally closed contact 2 to 1, and terminal TL2. Relay R1 now closes with its contacts establishing fifth and sixth circuits and breaking the first circuit by opening relay R1 back contact 4 to 5.

Relay R4 is closed by a fifth circuit formed by closing relay R1. This fifth circuit is formed from terminal TL2 to relay R1 closed contact 8 to 9, terminal T10 in Figs. 3 and 2, relay R4 coil, and line L1.

Pilot light signal JPL in Fig. 3 is lit by a sixth circuit to indicate that the return action is occurring. This sixth circuit is from terminal TL1 to pilot light JPL, relay R1 closed contact 2 to 3, and terminal TL2.

Also, the first circuit is broken to de-energize and disengage brake D14 and to de-energize and disengage clutch 17. This first circuit is broken by energized relay R1 opening relay R1 back contact 4 to 5.

Closing relay R4 de-energizes and disengages clutch P3 in Fig. 4 by breaking the third circuit by opening R4 back contact 1 to 2.

Closing relay R4 energizes and engages brake P11 in Fig. 4 by establishing the second circuit by closing relay R4 contact 2 to 3.

Closing relay R4 energizes by a seventh circuit the motor PM3 to rotate it through its return movement cycle. The seventh circuit is from line L1 in Fig. 2 to motor PM3, relay R4 closed contact 5 to 6, and line L2. Positioning motor PM3 is a conventional quarter phase wound motor with a condenser marked PM3C.

Now, motor PM3 begins to move cross head J3 and shaft H1 by pin J6 through a return movement cycle, clutch 17 is disengaged so that unit F will not be moved by shaft H1, brake D14 is released so that arm D11 can rotate counterclockwise in Fig. 1 to recalibrate unit D, clutch P3 is disengaged in Fig. 4 so rotation of shaft H1 will not rotate shaft P5, and brake P11 is engaged so that shaft P5 cannot move to change the control setting in unit P of unit U.

As crosshead J3 advances toward the left, switch S2 contact 1 to 3 is closed to provide a holding circuit to keep relay R1 closed when the actuation of switch S2 opens switch S2 contact 1 to 2, or when switch S1 contact 1 to 2 opens, to break the fourth circuit energizing relay R1 coil. This holding or eighth circuit is from terminal TL1 to switch S2 contact 3 to 1, relay R1 coil, switch S3 contact 2 to 1, and terminal TL2. Thus, motor PM3 continues to be energized and continues to rotate after switch S1 contact 1 to 2 and switch S2 contact 1 to 2 open.

Either of two modes of operation hereinafter described may be used to complete the return movement. The first mode of operation requires receipt of a time signal from unit B by closing switch S4 in Fig. 4. Hence, if the utility company has changed its time of the hour when the demand time period begins or if the return motions of unit B and the unit J get out of step, this time signal will reestablish the synchronization. Obviously, the demand time period of motors C5 and S1M must coincide with that measured by motor B5 in the public utilities demand meter unit B1. The second mode of operation uses no time signal; units B and J rely solely on the frequency of source Q for their synchronization.

The aforementioned first mode of operation will be first discussed, and it will be assumed that switch S4 has not been closed at the proper time. However, if switch S4 had been closed, the circuits will be set up in the same manner as the second mode of operation discussed in detail hereinafter, as will be more apparent hereinafter, although switch S4 is shown as being cam actuated by electrically driven timing motor B5, switch S4 could also be actuated by a spring driven escapement mechanism commonly found in some utility demand meters, such as meter B1.

If the time signal has not been received from unit B (by closing switch S4), relays R1 and R4 will be deenergized, motor PM3 stopped, clutch P3 and clutch 17 are engaged, brake D14 is engaged, and brake P11 disengaged so that all return motion has stopped and the aforementioned clutches, brakes and relays are returned to the same position before return motion began. Now, crosshead J3, while stopped and awaiting the time signal, may be against pin J6 if this pin was returned from one of the extreme, dotted line positions in Fig. 3. Then, while awaiting the time signal, engaged clutch 17 will permit shaft H1 and pin J6 to be rotated by unit F. If rotation of pin J6 is away from crosshead J3, suitable control over the draft on source Q is obtained by pointer I2 through the zone around 100 percent, where control is most important so that the reference level is not exceeded. If rotation of pin J6 is toward crosshead J3, clutch 17 will slip to permit shaft H1 to remain stationary and to prevent part breakage or damage while output shaft F15 continues to rotate.

The action in the preceding paragraph takes place when crosshead trip shoe J3b actuates switch S3, as crosshead J3 moves to the left, to open switch S3 contact 1 to 2 to break either the fourth or eighth circuit energizing relay R1 coil. As relay R1 opens, relay R4 opens, motor PM3 stops, clutch P3 is engaged, and brake P11 is disengaged by making the third circuit and by breaking the second, fifth, sixth and seventh circuits.

As the seventh circuit is broken to deenergize motor PM3, dynamic braking is applied to motor PM3 by a ninth circuit applying dynamic braking to motor PM3 upon opening of relay R4 by a circuit from line L1 in Fig. 2 to motor PM3, through parallel paths through (1) relay R4 closed back contact 5 to 4 and (2) relay R4 closed back contact 8 to 7, A.-C. to D.-C. rectifier PM3R, and line L2. This dynamic braking will occur whenever motor PM3 is stopped by opening relay R4.

Also this aforementioned actuation of switch S3 by trip shoe J3b energizes relay R9 to stop the demand time period timing action of synchronous motors C5 and S1M. Relay R9 is energized by a tenth circuit from terminal TL1 to relay R8 closed back contact 5 to 4, relay R9 coil, switch S3 contact 3 to 1, and terminal TL2.

Closing relay R9 stops timing synchronous motors C5 and S1M by opening relay R9 back contact 1 to 2 to break an eleventh circuit from terminal TL2 to relay R9 closed back contact 1 to 2; parallel circuits through (1) terminal T1, timing motor C5, and terminal T2, and (2) timing motor S1M; and terminal TL1.

This condition of unit J continues until unit B provides a timing signal by momentarily closing switch S4 to indicate unit B is in its return motion.

When switch S4 closes, timing motors C5 and S1M are reenergized and relay R1 coil is again energized. Closing relay R1 energizes relay R4, disengages clutches 17 and P3, disengages brake D14, engages brake P11, lights light JPL and energizes motor PM3 by making the second, fifth, sixth and seventh circuits, and by breaking the third circuit, as mentioned in more detail in the following paragraphs. Then, motor PM3 can continue the return motion until it is completed.

Closing switch S4 energizes timing motors C5 and S1M and energizes relay R1 to provide the actions mentioned in the preceding paragraph in the following manner. Closing switch S4 energizes relay R8 by establishing a twelfth circuit from terminal TL1 to switch S2 contact 3 to 1, relay R8 coil, closed switch S4, and terminal TL2. If switch S4 opens before the return motion is completed, relay R8 is held closed by a holding or thirteenth circuit from terminal TL1 to switch S2 contact 3 to 1, relay R8 coil, relay R8 contact 3 to 2, and terminal TL2. Since both the twelfth and thirteenth circuits require switch S2 contact 3 to 1 closed, the signal from switch S4 must come after crosshead trip shoe J3b has advanced and actuated switch S2 to close switch S2 contact 3 to 1. A switch S4 signal received before the actuation of switch S2 will not energize relay R8 coil. Relay R9 is opened by the closing of relay R8 opening relay R8 back contact 4 to 5 to break the tenth circuit, which action reestablishes the eleventh circuit by closing relay R9 back contact 1 to 2 to start up and continue the operation of synchronous timing motors C5 and S1M. Relay R1 coil is energized, after relay R8 closes, by a fourteenth circuit from terminal TL1 to switch S2 contact 3 to 1, relay R1 coil, relay R8 closed contact 9 to 8, and terminal TL2.

Since the closing of relay R1 closes relay R4 by reestablishing the fifth circuit, the closing of relay R4 reestablishes the seventh circuit to energize motor PM3, which continues its rotation until the end of the return motion. Motor PM3 remains energized even after switch S3 is released to open switch S3 contact 3 to 1 by shoe J3b near the end of the return motion. The fifth, seventh and fourteenth circuits do not go through switch S3.

Motor PM3 is stopped at the end of the return motion by shoe J3a moving out of contact with switch S2 to opening switch S2 contact 3 to 1 to open relay R1 by opening the fourteenth circuit to stop motor PM3 by opening the fifth circuit at relay R1 contact 8 to 9 to open relay R4, and by opening the seventh circuit at relay R4 contact 5 to 6 deenergize motor PM3 and stop this motor by establishing the dynamic braking or ninth circuit.

Now all components of unit J and of the apparatus are back in their original condition before the start of the return motion. Relays R1, R4, R8 and R9 are open; switch S1 contact 1 to 2 is open; timing motors S1M and C5 are running; motor PM3 is stopped; switch S2 contact 1 to 2 and switch S3 contact 1 to 2 are both closed. Relay R1 coil cannot be energized by the fourth circuit because switch S1 contact 1 to 2 has previously opened. Relay R8 has been opened by opening switch S2 contact 3 to 1 to break the twelfth and/or thirteenth circuits. Open relay R1 energizes electric brake D14 (engaged) and clutch 17 (engaged) by the first circuit from rectifier 16 D.-C. terminal 16A to terminal T3 in Figs. 2 and 3, relay R1 closed back contact 4 to 5, terminal T6 in Figs. 3 and 2, parallel paths through clutch 17 and brake D14, and rectifier 16 D.-C. terminal 16B. Also, open relay R4 in Fig. 2 de-energizes brake P11 (disengaged) by breaking at relay R4 open contact 2 to 3 the second circuit from rectifier 16 D.-C. terminal 16A to terminal T11 in Figs. 2 and 4, brake P11, terminal T7 in Figs. 4 and 2, relay R4 contact 3 to 2, and rectifier 16 D.C. terminal 16B. Hence, during the next demand time period energized brake D14 prevents drop of arm D11 in unit D for demand recalibration during the next demand time period, clutch 17 is engaged so that unit F can drive shaft H1, clutch P3 is engaged and brake P11 is disengaged so shaft H13 can drive shaft P5. Open relay R4 in Fig. 2 energizes clutch P3 (engaged) by the third circuit from rectifier 16 D.-C. terminal 16A to terminal T11 in Figs. 2 and 4, clutch P3, terminal T8 in Figs. 4 and 2, relay R4 closed back contact 1 to 2, and rectifier 16 D.-C. terminal 16B. Now, the whole apparatus is restored to proper operating condition during the demand time period with unit F controlling units I, P and U in response to the draft on source Q in the manner earlier described.

The second mode of operation will next be discussed. This uses no time signal by switch S4 from unit B; units B and J rely on the frequency of source Q for their synchronization. If the operation is described with switch S4 always closed, this second mode of operation will be readily apparent.

This second mode of operation is best started with the eighth or holding circuit established with crosshead J3 moving toward the left in Fig. 3 with shoe J3b about to actuate switch S3. Now, relay R4 is closed; motor PM3 is energized; pilot light JPL is energized; brake D14 and clutch 17 and clutch P3 are disengaged and deenergized; brake P11 is energized and engaged; synchronous timing motors C5 and S1M are energized because the first and third circuits are broken and the second, fifth, sixth and seventh circuits are established. The eleventh circuit remains closed and has not been opened. The eighth circuit is from terminal TL1 to switch S2 contact 3 to 1, relay R1 coil, switch S3 contact 2 to 1, and terminal TL2.

Relay R1 coil and motor PM3 continue to be energized as crosshead shoe J3b opens switch S3 contact 2 to 1, which action stopped motor PM3 in the first mode of operation. Since switch S4 is always closed in this second mode of operation, the relay R8 coil is energized by the twelfth circuit when switch S2 contact 3 to 1 closed and then is held closed by the holding or thirteenth circuit. Then, as actuation of switch S3 opens the eighth circuit, relay coil R1 remains energized by the fourteenth circuit (established by closed relay R8) until switch S2 contact 3 to 1 is opened at the end of the return movement by shoe J3a moving clear of switch S2 to open the fourteenth circuit.

Now, the components are back in their original condition before the start of the return motion, as previously described at the end of the first mode of operation. Relays R1, R4, R8 and R9 are open; switch S1 contact 1 to 2 is open; timing motors S1M and C5 are running; motor PM3 is stopped; switch S2 contact 1 to 2 and switch S3 contact 1 to 2 are both closed. Relay R8 coil is deenergized, even though switch S4 is closed, because the holding or fourteenth circuit is broken by switch S2 open contact 3 to 1.

Clutches 17 and P3 are engaged and brake P11 is disengaged so unit F controls units H and P during the next demand time period. Brake D14 is engaged so unit D cannot be recalibrated by unit C during the next demand time period.

OTHER USES

The apparatus has been described with meter A1 being a kwh. or kvah. meter, unit C and rod 27 adapted to move arm D11 for recalibrating the reference level, unit D, the demand load reference level being the average rate of power use over a full demand time period required to incur the established highest demand load incurred during the prevailing billing period, time clock switch A4 recalibrating the apparatus with respect to time to take advantage of lower rates in "off-peak hours," and unit J returning shaft H1 and pointer I2 to the "100" or reference level position at the end of each demand time period while disengaging clutches 17 and P3, disengaging brake D14 and engaging brake P11. However, slight changes in structure, such as removal of or making substitution for some of these components, readily lend this apparatus to other uses.

For example, if unit U included only synchronous power converter element Z for providing D.-C. power to a billet rolling mill, pointer I2 could give a continuous indication of load trend on the mill so that the operator could keep it fully loaded with element Z being used at full capacity. Then, unit J could be eliminated because periodic return of pointer I2 to the reference level need not occur and pointer I2 and/or unit P can run continuously without periodic interruptions; clutches 17 and P3 would remain continuously engaged or be replaced by direct drives; and unit C, pointer I4, rod 27, and time clock switch A4 could be eliminated.

Meter A1 may be of any suitable type, such as a kwh., kvah., volt, ampere, or any other suitable type meter.

By appropriate selection of meter A1, in a suitable combination of at least some of the units in Fig. 1, unit U may be controllably responsive by unit I or P to any desired operational characteristic of the apparatus, such as shown herein by the position of shaft H1, and especially time averaged or time integrated characteristics wherein unit G provides the time factor. Such operational characteristics include the ratio or relationship between the average rate of actual kwh. or kvah. draft upon source Q from the beginning of the current demand time period and the demand load reference level, as described in detail heretofore; the rate of power use of unit U; the production output of or the load trend of a load element or elements of unit U; and/or the ratio at the end of the demand time period of the present average rate of power-use to the highest average rate of power-use incurred, as described in detail heretofore. The so called "reference level" may be any suitable operational limitation effecting the amount of energy transformed by unit U (such reference level as an upper limit beyond which some portion of the apparatus should not be used), such as the demand load reference level draft on source Q previously described; heat generated by electric current flow in an element of unit U during energy transformation, and/or a torque or force transmitted in unit U during energy transformation. This reference level for the demand load is established herein by a predetermined radial setting of disc D7 on wheel 23.

Also, the reference level may be manually recalibrated or automatically recalibrated in response to any other external condition by suitable energization of relay R7, adjustment of rheostats A2 and A3; and/or movement of arm D11 when rod 27 and unit C are eliminated and when brake D14 is deenergized or eliminated. For example, a temperature responsive bellows may move arm D11 when unit C, rod 27 and brake D14 are removed if recalibration is in response to the ambient temperature, such as when the aforementioned reference level or operational limitation is heat generated by power flow in a load element of unit U, such as element Z, wherein a higher rate of energy transformation might be permitted at lower ambient temperature, when greater temperature loss occurred.

Various changes in details and arrangement of parts can be made by one skilled in the art without departing from the spirit of this invention or the scope of the appended claims.

What is claimed is:

1. Apparatus, comprising a kwh. or kvah. demand meter measuring the kwh. or kvah. draft upon a power source for a given demand time period, an energy transforming unit electrically connected to said source and demand meter, a unit control means substantially synchronized with said demand meter to operate over substantially the same given demand time period and responsive to said draft so that said unit is controllably responsive for confining the draft upon said source below a kw. or kva. demand load reference level over said given demand time period, and means responsive to the draft for recalibrating in one direction the demand load reference level of said unit control means, if said demand load reference level is exceeded in a demand time period by a second demand load to a new demand load reference level equivalent to said second demand load for use as the new reference level in subsequent demand time periods.

2. Apparatus, as set forth in claim 1, with manual recalibration means for recalibrating said unit control means in the opposite of said one direction at the end of a time period to a new reference level.

3. Apparatus, comprising a kwh. or kvah. demand meter measuring the kwh, or kvah. draft upon a power source for a given demand time period, an energy transforming unit electrically connected to said source and demand meter, a unit control means substantially synchronized with said demand meter to operate over substantially the same given demand time period and responsive to said draft so that said unit is controllably responsive for confining the draft upon said source below a kw. or kva. demand load reference level over said given demand time period, said demand meter including signalling means for signalling a predetermined phase of said demand time period, and synchronizing means responsive to said signalling means for keeping said unit control means synchronized with said demand meter as to demand time period.

4. Apparatus, comprising a kwh. or kvah. demand meter measuring the kwh. or kvah. draft upon a power source for a given demand time period, an energy transforming unit electrically connected to said source and demand meter, a unit control means substantially synchronized with said demand meter to operate over substantially the same given demand time period and responsive to said draft so that said unit is controllably responsive for confining the draft upon said source below a kw. or kva. demand load reference level over said given demand time period, and synchronization means for normally maintaining synchronized said meter and unit control means, said demand meter including signalling means for signalling a predetermined phase of said demand time period, and said synchronization means including synchronizing means responsive to said signalling means for reestablishing synchronization if said meter and unit control means become non-synchronized.

5. Apparatus for controlling the use of electric power from an electric power source, comprising an energy transforming unit electrically connected to said source of electric power, and electrically actuated unit control means responsive to the draft upon said source so that said unit is controllably responsive for confining, if possible, the draft upon said source over a given demand time period below a kw. or kva. demand load reference level already established by the draft in an earlier demand time period of the billing time period comprising one or more separate demand time periods.

6. Apparatus for controlling the use of electric power from an electric power source, comprising an energy transforming unit electrically connected to said source of electric power, a unit control means responsive to the draft upon said source so that said unit is controllably responsive for confining, if possible, the draft upon said source below a kw. or kva. demand load reference level over a given demand time period, time operated means for adjusting the response of said unit control means to the draft upon said source with respect to time to increase the permissive draft and said reference level during "off peak" periods.

7. Apparatus for controlling the use of electric power from an electric power source, comprising an energy transforming unit electrically connected to said source of electric power, a unit control means responsive to the draft upon said source so that said unit is controllably responsive for confining, if possible, the draft upon said source below a kw. or kva. demand load reference level over a given demand time period, said unit control means comprising an operator-indicator-type unit control means for audibly signalling that the draft is about to exceed said reference level and the end of the demand time period is approaching.

8. Apparatus for controlling the use of electric power from an electric power source, comprising an energy transforming unit electrically connected to said source of electric power, a unit control means responsive to the draft upon said source so that said unit is controllably responsive for confining, if possible, the draft upon said source below a kw. or kva. demand load reference level over a given demand time period, and signalling means for indicating one end of a demand time period so that said unit control means is controllably synchronizable with a billing demand meter measuring the demand draft on said source.

9. Apparatus for controlling the use of electric power from an electric power source, comprising an energy transforming unit electrically connected to said source of electric power, a unit control means responsive to the draft upon said source so that said unit is controllably responsive for confining, if possible, the draft upon said source below a kw. or kva. demand load reference level over a given demand time period, and means responsive to the draft for recalibrating the demand load reference level of said unit control means, if said demand reference level is exceeded in a demand time period by a second demand load, to a new demand load reference level equivalent to said second demand load for use as the new reference level in subsequent demand time periods.

10. Apparatus, as set forth in claim 9, with said energy transforming unit including an electric power generating unit element; and said unit control means including means for increasing the output of said generating unit element to furnish power to the system connected with said source when the draft on the source exceeds said reference level.

11. Apparatus for controlling the use of electric power from an electric power source, comprising an energy transforming unit electrically connected to said source of electric power, a unit control means responsive to the draft upon said source so that said unit is controllably responsive for confining, if possible, the draft upon said source below a kw. or kva. demand load reference level over a given demand time period, said unit control means comprising an operator-indicator-type unit control means having an indicator wherein the operator suitably adjusts the unit after sensing the indicator.

12. Apparatus, as set forth in claim 11, with operator-indicator-type timing means having a time indicator indicating the time remaining in said time period with both said indicators being operatively associated.

13. Apparatus for controlling the use of electric power from an electric power source, comprising an energy transforming unit electrically connected to said source of electric power, a unit control means responsive to the draft upon said source so that said unit is controllably responsive for confining, if possible, the draft upon said source below a kw. or kva. demand load reference level over a given demand time period, said unit control means comprising a first measuring means responsive to said draft for measuring proportionally to the draft on said source from the beginning of a demand time period, and comprising a second measuring means for measuring at a uniform rate from the beginning of said demand time period with said rate being proportional to a constant draft at said reference level from the beginning of said demand time period, and comprising means for indicating on a single axis the unbalance between said measuring means for controlling said unit.

14. Apparatus for controlling the use of electric power from an electric power source, comprising an energy transforming unit electrically connected to said source of electric power, a unit control means responsive to the draft upon said source so that said unit is controllably responsive for confining, if possible, the draft upon said source below a kw. or kva. demand load reference level over a given demand time period, said unit control means comprising a first measuring means responsive to said draft for measuring proportionally to the draft on said source from the beginning of a demand time period, and comprising a second measuring means for measuring at a uniform rate from the beginning of said demand time period with said rate being proportional to a constant draft at said reference level from the beginning of said demand time period, said first measuring means having a member rotating about an axis proportional to the draft, and said second measuring means having a member rotating about said axis at a uniform rate, whereby the unbalance between said measuring means is indicated on a single axis for controlling said unit.

15. Apparatus for controlling the use of electric power from an electric power source, comprising an energy transforming unit electrically connected to said source of electric power, a unit control means responsive to the draft upon said source so that said unit is controllably responsive for confining, if possible, the draft upon said source below a kw. or kva. demand load reference level over a given demand time period, said unit control means comprising a first measuring means responsive to said draft for measuring proportionally to the draft on said source from the beginning of a demand time period, and comprising a second measuring means for measuring at a uniform rate from the beginning of said demand time period with said rate being proportional to a constant draft at said reference level from the beginning of said demand time period, and comprising means for indicating the unbalance between said measuring means by an indicator remaining substantially stationary when the draft is at said reference level.

16. Apparatus for controlling the use of electric power from an electric power source, comprising an energy transforming unit electrically connected to said source of electric power, a unit control means responsive to the draft upon said source so that said unit is controllably responsive for confining, if possible, the draft upon said source below a kw. of kva. demand load reference level over a given demand time period, said unit control means comprising a first measuring means responsive to said draft for measuring proportionally to the draft on said source from the beginning of a demand time period, and comprising a second measuring means for measuring at a uniform rate from the beginning of said demand time period with said rate being proportional to a constant draft at said reference level from the beginning of said demand time period, and means responsive to the unbalance between said first and second means so that said unit is controllably responsive for confining, if possible, the draft upon said source below a kw. or kva. demand load reference level over a given demand time period, said first measuring means including an impulse producing kw.-hr. or kva.-hr. meter responsive to said draft.

17. Apparatus, as set forth in claim 16, with unit control recalibration means including means responsive to the draft for varying the impulse output of said meter in relation to the reference level.

18. Apparatus for controlling the use of electric power from an electric power source, comprising an energy transforming unit electrically connected to said source of electric power and having an operational limitation reference level effecting the amount of energy transformed thereby, unit control means responsive to the draft upon said source so that said unit is controllably responsive to said draft to keep its electrical energy transformation at or below said operational limitation reference level, and adjusting means for adjusting said reference level of the unit control means to vary said operational limitation reference level.

19. Apparatus for controlling the use of electric power from an electric power source, comprising an energy transforming unit electrically connected to said source of electric power, and a unit control means responsive to the draft upon said source so that said unit is controllably responsive to an operational characteristic of the apparatus, said operational characteristic being the load trend of the unit.

20. Apparatus for controlling the use of electric power from an electric power source, comprising an energy transforming unit electrically connected to said source of electric power, and a unit control means responsive to the draft upon said source so that said unit is controllably responsive to an operational characteristic of the apparatus, said operational characteristic being the production output of the unit.

21. Apparatus for controlling the use of electric power from an electric power source, comprising an energy transforming unit electrically connected to said source of electric power, and a unit control means responsive to the draft upon said source so that said unit is controllably responsive to an operational characteristic of the apparatus, said operational characteristic being the ratio of the present average rate of power-use to the highest average rate of power-use incurred.

22. Apparatus for controlling the use of electric power from an electric power source, comprising an energy transforming unit electrically connected to said source of electric power, and a unit control means responsive to the draft upon said source so that said unit is controllably responsive to the draft upon said power source, said unit including three energy transforming unit elements each electrically connected to said source of electric power, and said unit control means being an automatic-type unit control means automatically controlling each element of said unit in response to said draft.

23. Apparatus, as set forth in claim 22, with said automatic-type unit control means including means responsive to said draft for controlling each of said unit elements in a predetermined and independent manner.

24. Apparatus for controlling the use of electric power from an electric power source, comprising an energy transforming unit electrically connected to said source of electric power, a unit control means responsive to the draft upon said source so that said unit is controllably responsive to the draft upon said power source, said unit including two energy transforming unit elements each electrically connected to said source of electric power, said unit control means being an automatic-type unit control means automatically controlling each of said unit elements in response to said draft, said automatic-type unit control means including a differential transformer control system operatively connected to each of said unit elements for control thereof.

25. Apparatus for controlling the use of electric power from an electric power source, comprising an energy transforming unit electrically connected to said source of electric power, a unit control means responsive to the draft upon said source so that said unit is controllably responsive to the draft upon said power source, said unit including two energy transforming unit elements each electrically connected to said source of electric power, said unit control means being an automatic-type unit control means automatically controlling each of said unit elements in response to said draft, each of said unit elements including a manual controller, and including connecting means detachably operatively connecting said automatic-type unit control means to the manual controller of said unit element, whereby disconnection of said connecting means permits manual control of said unit element.

26. Apparatus for controlling the use of electric power from an electric power source, comprising an energy transforming unit electrically connected to said source of electric power, a unit control means responsive to the draft upon said source so that said unit is controllably responsive to the draft upon said power source, said unit including two energy transforming unit elements each electrically connected to said source of electric power, said unit control means being an automatic-type unit control means automatically controlling each of said unit elements in response to said draft, each of said unit elements including a manual controller, and including connecting means operatively connecting said automatic-type unit control means to the manual controller of said unit element, whereby disconnection of said connecting means permits manual control of said unit element, said connecting means having a plurality of operatively connecting positions with each position providing a different control rate for said unit element for a given position of said automatic-type unit control means.

27. Apparatus for controlling the use of electric power from an electric power source, comprising an energy transforming unit electrically connected to said source of electric power, a unit control means responsive to the draft upon said source so that said unit is controllably responsive to the draft upon said power source, said unit including two energy transforming unit elements each electrically connected to said source of electric power, said unit control means being an automatic-type unit control means automatically controlling each of said unit elements in response to said draft, said unit control means comprising a first measuring means responsive to said draft for measuring proportionally to the draft on said source from the beginning of a time period, and comprising a second measuring means for measuring at a uniform rate from the beginning of said time period with said rate being proportional to a constant draft at said reference level from the beginning of said time period, said unit control means including servo-motor means for each unit element having a transmitter connected for movement in response to the unbalance of said measuring means and having a receiver operatively connected to said unit element for control thereof.

28. Apparatus for controlling the use of electric power from an electric power source, comprising an energy transforming unit electrically connected to said source of electric power, a unit control means responsive to the draft upon said source so that said unit is controllably responsive to the draft upon said power source, said unit including two energy transforming unit elements each electrically connected to said source of electric power, said unit control means being an automatic-type unit control means automatically controlling each of said unit elements in response to said draft, said automatic-type unit control means including means responsive to said draft for increasing the energy transformation of one of said unit elements while decreasing the energy transformation of the other of said unit elements.

29. Apparatus for controlling the use of electric power from an electric power source, comprising an energy transforming unit electrically connected to said source of electric power, a unit control means responsive to the draft upon said source so that said unit is controllably responsive to the draft upon said power source, said unit including two energy transforming unit elements each electrically connected to said source of electric power, said unit control means being an automatic-type unit control means automatically controlling each of said unit elements in response to said draft, said automatic-type unit control means including means responsive to said draft for controlling each of said unit elements in a predetermined and independent manner, said last mentioned means comprising a common cam shaft driven in response to said draft and comprising two cams adjustably mounted on said cam shaft with one cam controlling each unit element.

30. Apparatus for controlling the use of electric power from an electric power source, comprising an energy transforming unit electrically connected to said source of electric power, a unit control means responsive to the draft upon said source so that said unit is controllably responsive to the draft upon said power source, said unit including two energy transforming unit elements each electrically connected to said source of electric power, said unit control means being an automatic-type unit control means automatically controlling each of said unit elements in response to said draft, said unit control means comprising means positively and independently controlling each of said unit elements throughout the draft range.

31. Apparatus for controlling the use of electric power from an electric power source, comprising an energy transforming unit electrically connected to said source of electric power, a unit control means responsive to the draft upon said source so that said unit is controllably responsive to the draft upon said power source, said unit including two energy transforming unit elements each electrically connected to said source of electric power, said unit control means being an automatic-type unit control means automatically controlling each of said unit elements in response to said draft, said unit control means comprising means positively and independently controlling each of said unit elements below a reference level.

32. Apparatus for controlling the use of electric power from an electric power source, comprising an energy transforming unit electrically connected to said source of electric power, a unit control means responsive to the draft upon said source so that said unit is controllably responsive to the draft upon said power source, said unit including two energy transforming unit elements each electrically connected to said source of electric power, said unit control means being an automatic-type unit control means automatically controlling each of said unit elements in response to said draft, at least one of said unit elements being an electrically powered load unit element.

33. Apparatus, as set forth in claim 32, with said automatic-type unit control means including means responsive to said draft for controlling each of said unit elements in a predetermined and independent manner.

34. Apparatus, as set forth in claim 33, with said automatic-type unit control means including manually adjustable means for manually changing said predetermined manner.

35. Apparatus, as set forth in claim 33, with said unit control means and said unit including means for manually controlling one of said unit elements while the other of said unit elements is automatically controlled by said automatic-type unit control means.

36. Apparatus, as set forth in claim 32, with said automatic-type unit control means including means responsive to said draft for controlling each of said unit elements in a predetermined and independent manner with said two unit elements being sequentially controlled.

37. Apparatus, as set forth in claim 32, with said automatic-type unit control means including means responsive to said draft for controlling each of said unit elements in a predetermined and independent manner with said two unit elements being concurrently controlled.

38. Apparatus, as set forth in claim 32, with the other of said unit elements being a power generating unit element.

39. Apparatus for controlling the use of electric power from an electric power source, comprising an energy transforming unit electrically connected to said source of electric power, and a unit control means responsive to the draft upon said source so that said unit is controllably responsive to the draft upon said power source, said unit control means comprising an operator-indicator-type unit control means having an indicator wherein the operator suitably adjusts the unit after sensing the indicator.

40. Apparatus, as set forth in claim 39, with said operator-indicator-type unit control means including an indicator movable relative to a reference level, means for returning said indicator to said reference level at an appropriate time without changing the rate of energy 41. Apparatus, as set forth in claim 40, with said means for returning said indicator including braking means for said unit control means to lock the unit control adjustment in position during the return movement of said indicator.

42. Apparatus for controlling the use of electric power from an electric power source, comprising an energy transforming unit electrically connected to said source of electric power, a unit control means responsive to the draft upon said source so that said unit is controllably responsive to the draft upon said power source, and time operated means for adjusting the response of said unit control means to the draft upon said source with respect to time to increase the permissive draft during "off peak" periods.

43. Apparatus for controlling the use of electric power from an electric power source, comprising an energy transforming unit electrically connected to said source of electric power, and a unit control means responsive to the draft upon said source so that said unit is controllably responsive to the draft upon said power source, said unit control means comprising an operator-indicator-type unit control means having a plurality of spaced apart indicators wherein the operator suitably adjusts the unit after sensing one of the indicators.

44. Apparatus, as set forth in claim 43, with said unit control means including coupled selsyns for driving said indicators.

45. Apparatus for controlling the use of electric power from an electric power source, comprising an energy transforming unit electrically connected to said source of electric power, a unit control means responsive to the draft upon said source so that said unit is controllably responsive to the draft upon said power source, said unit control means comprising a first measuring means responsive to said draft for measuring proportionally to the draft on said source from the beginning of a time period, and comprising a second measuring means for measuring at a uniform rate from the beginning of said time period with said rate being proportional to a constant draft at said reference level from the beginning of said time period, said unit control means having a reference level, and recalibration means responsive to a prearranged change in said draft for automatically recalibrating said unit control means to a new reference level, said recalibration means including means responsive to the draft for varying the output of one of said measuring means in relation to the reference level.

46. Apparatus for controlling the use of electric power from an electric power source, comprising an energy transforming unit electrically connected to said source of electric power, and a unit control means responsive to the draft upon said source so that said unit is controllably responsive to the draft upon said power source, said unit control means comprising a first measuring means responsive to said draft for measuring proportionally to the draft on said source from the beginning of a time period, and comprising a second measuring means for measuring at a uniform rate from the beginning of said time period with said rate being proportional to a constant draft at said reference level from the beginning of said time period, and comprising means responsive to the unbalance between said first and second measuring means so that said unit is controllably responsive to the draft, said last mentioned means including a geared differential driven by both of said measuring means.

47. Apparatus for controlling the use of electric power from an electric power source, comprising an energy transforming unit electrically connected to said source of electric power, and a unit control means responsive to the draft upon said source so that said unit is controllably responsive to the draft upon said power source, said unit control means comprising a first measuring means responsive to said draft for measuring proportionally to the draft on said source from the beginning of a time period, and comprising a second measuring means for measuring at a uniform rate from the beginning of said time period with said rate being proportional to a constant draft at said reference level from the beginning of said time period, and comprising means for indicating on a single axis the unbalance between said measuring means for controlling said unit.

48. Apparatus for controlling the use of electric power from an electric power source, comprising an energy transforming unit electrically connected to said source of electric power, and a unit control means responsive to the draft upon said source so that said unit is controllably responsive to the draft upon said power source, said unit control means comprising a first measuring means responsive to said draft for measuring proportionally to the draft on said source from the beginning of a time period, and comprising a second measuring means for measuring at a uniform rate from the beginning of said time period with said rate being proportional to a constant draft at said reference level from the beginning of said time period, said first measuring means having a member rotating about an axis proportional to the draft, and said second measuring means having a member rotating about said axis at a uniform rate, whereby the unbalance between said measuring means is indicated on a single axis for controlling said unit.

49. Apparatus for controlling the use of electric power from an electric power source, comprising an energy transforming unit electrically connected to said source of electric power, and a unit control means responsive to the draft upon said source so that said unit is controllably responsive to the draft upon said power source, said unit control means comprising a first measuring means responsive to said draft for measuring proportionally to the draft on said source from the beginning of a time period, and comprising a second measuring means for measuring at a uniform rate from the beginning of said time period with said rate being proportional to a constant draft at said reference level from the beginning of said time period, and comprising means responsive to the unbalance between said measuring means for indicating the rate of change of said unbalance.

50. Apparatus for controlling the use of electric power from an electric power source, comprising an energy transforming unit electrically connected to said source of electric power, and a unit control means responsive to the draft upon said source so that said unit is controllably responsive to the draft upon said power source, said unit control means comprising a first measuring means responsive to said draft for measuring proportionally to the draft on said source from the beginning of a time period, and comprising a second measuring means for measuring at a uniform rate from the beginning of said time period with said rate being proportional to a constant draft at said reference level from the beginning of said time period, said unit control means including servo-motor means having a transmitter connected for movement in response to the unbalance between said measuring means and having a receiver operatively connected to said unit for control thereof.

51. Apparatus for controlling the use of electric power from an electric power source, comprising an energy transforming unit electrically connected to said source of electric power, and a unit control means responsive to the draft upon said source so that said unit is controllably responsive to the draft upon said power source, said unit control means comprising an automatic-type unit control means automatically controlling said unit in response to said draft, said automatic-type unit control means including a differential transformer control system operatively connected to said unit for control thereof.

52. Apparatus for controlling the use of electric power from an electric power source, comprising an energy transforming unit electrically connected to said source of electric power, and a unit control means responsive to the draft upon said source so that said unit is controllably responsive to the draft upon said power source, said unit control means comprising an automatic-type unit control means automatically controlling said unit in response to said draft, said unit including a manual controller, and including connecting means detachably operatively connecting said automatic-type unit control means to the manual controller of said unit, whereby disconnection of said connecting means permits manual control of said unit.

53. Apparatus for controlling the use of electric power from an electric power source, comprising an energy transforming unit electrically connected to said source of electric power, and a unit control means responsive to the draft upon said source so that said unit is controllably responsive to the draft upon said power source, said unit control means comprising an automatic-type unit control means automatically controlling said unit in response to said draft, said unit including a manual controller, and including connecting means operatively connecting said automatic-type unit control means to the manual controller of said unit, whereby disconnection of said connecting means permits manual control of said unit, said connecting means having a plurality of operatively connecting positions with each position providing a different control rate for said unit for a given position of said automatic-type unit control means.

54. Apparatus for controlling the use of electric power from an electric power source, comprising an energy transforming unit electrically connected to said source of electric power, a unit control means responsive to the draft upon said source so that said unit is controllably responsive to the draft upon said power source, said unit control means having a reference level, and recalibration means responsive to a prearranged change in said draft for automatically recalibrating said unit control means to a new reference level.

55. Apparatus, as set forth in claim 54, with said unit control means including a meter responsive to said draft, and said recalibration means including means responsive to the draft for varying the output of said meter in relation to the reference level.

56. Apparatus for controlling the use of electric power from an electric power source, comprising an energy transforming unit electrically connected to said source of electric power, a unit control means responsive to the draft upon said source so that said unit is controllably responsive to the draft upon said power source, said unit control means having a reference level, and recalibration means responsive to a prearranged change in said draft for automatically recalibrating said unit control means to a new reference level at the end of a time period with said end being time spaced subsequent to said prearranged change.

57. Apparatus for controlling the use of electric power from an electric power source, comprising an energy transforming unit electrically connected to said source of electric power, a unit control means responsive to the draft upon said source so that said unit is controllably responsive to the draft upon said power source, said unit control means having a reference level, and recalibration means responsive to a prearranged change in said draft for automatically recalibrating said unit control means to a new reference level at the end of a time period with said end being time spaced subsequent to said prearranged change and with the beginning of said time period being independent of said prearranged change.

58. Apparatus for controlling the use of electric power from an electric power source, comprising an energy transforming unit electrically connected to said source of electric power, a unit control means responsive to the draft upon said source so that said unit is controllably responsive to the draft upon said power source, said unit control means having a reference level, and recalibration means responsive to a prearranged change in said draft for automatically recalibrating said unit control means in a given direction to a new reference level, and manual recalibration means for recalibrating said unit control means in the opposite of said given direction at the end of a time period to a new reference level.

59. Apparatus for controlling the use of electric power from an electric power source, comprising an energy transforming unit electrically connected to said source of electric power, and a unit control means responsive to the draft upon said source so that said unit is controllably responsive to the draft upon said power source, said control means comprising means positively controlling said unit throughout the draft range.

60. Apparatus for controlling the use of electric power from an electric power source, comprising an energy transforming unit electrically connected to said source of electric power, a unit control means responsive to the draft upon said source so that said unit is controllably responsive to the draft upon said power source, said unit control means having a reference level, and adjusting means responsive to condition for automatically recalibrating said unit control means to a new reference level upon variation of said condition.

References Cited in the file of this patent

UNITED STATES PATENTS

| | | |
|---|---|---|
| 1,904,500 | McLenegan | Apr. 18, 1933 |
| 2,348,058 | Coates et al. | May 2, 1944 |
| 2,469,645 | Harper | May 10, 1949 |

UNITED STATES PATENT OFFICE
CERTIFICATE OF CORRECTION

Patent No. 2,923,831                                 February 2, 1960

Frank O. Wallene

It is hereby certified that error appears in the printed specification of the above numbered patent requiring correction and that the said Letters Patent should read as corrected below.

Column 3, line 21, for "kwa" read -- kva --; column 6, line 57, for "terminal T12" read -- terminal TL2 --; column 19, line 1, for "braking" read -- breaking --; column 26, line 25, after "demand" insert -- load --; column 27, line 58, for "kw.-hr. or kva.-hr." read -- kwh. or kvah. --; column 31, line 10, after "rate of energy" insert -- transformation of said unit by the unit control means. --.

Signed and sealed this 2nd day of August 1960.

(SEAL)
Attest:

KARL H. AXLINE
Attesting Officer

ROBERT C. WATSON
Commissioner of Patents